(12) United States Patent
Aso et al.

(10) Patent No.: US 8,744,240 B2
(45) Date of Patent: Jun. 3, 2014

(54) VIDEO DISTRIBUTION SYSTEM, INFORMATION PROVIDING DEVICE, AND VIDEO INFORMATION PROVIDING METHOD FOR DISTRIBUTING VIDEO TO A PLURALITY OF RECEIVING TERMINALS

(71) Applicant: Hitachi, Ltd., Tokyo (JP)

(72) Inventors: Daisuke Aso, Kawasaki (JP); Kaoru Konishi, Kawasaki (JP); Naohisa Seko, Kawasaki (JP); Kazumi Matsumoto, Tokyo (JP); Asako Miyamoto, Tokyo (JP); Mariko Doi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/706,977

(22) Filed: Dec. 6, 2012

(65) Prior Publication Data

US 2013/0160065 A1 Jun. 20, 2013

(30) Foreign Application Priority Data

Dec. 15, 2011 (JP) ................. 2011-274578

(51) Int. Cl.
*H04N 9/80* (2006.01)
*G06F 17/00* (2006.01)
*G06F 17/30* (2006.01)

(52) U.S. Cl.
USPC ........... 386/241; 386/248; 386/250; 707/673; 707/736; 707/741

(58) Field of Classification Search
USPC ........ 725/115, 38, 52, 61; 386/241, 248, 250; 707/673, 736, 741
See application file for complete search history.

(56) References Cited

U.S. PATENT DOCUMENTS 7,286,747 B1 * 10/2007 Lewis et al. .................. 386/282
7,403,801 B2 7/2008 Ishigaki
(Continued)

FOREIGN PATENT DOCUMENTS

JP 2001-243243 A 9/2001
JP 2008-262460 A 10/2008
(Continued)

OTHER PUBLICATIONS

"System, Method and Computer Program Product for Communicating Information Among Devices", IP.Com Journal, IP.Com Inc., West Henrietta, NY, US, May 2, 2006, XP013113969, ISSN: 1533-0001, pp. 8-15, figs. 2,3.

(Continued)

*Primary Examiner* — Hoang-Vu A Nguyen-Ba
(74) *Attorney, Agent, or Firm* — Volpe and Koenig, P.C.

(57) ABSTRACT

It is provided a video distribution system including a video distribution module, a control module, and a bookmark management module. The bookmark management module manages a first type bookmark whose status is not changed by viewing of the video and a second type bookmark whose status is changeable after the viewing of the video. The control module generates screen data that enables one of the first type bookmark and the second type bookmark to be selected with regard to the video stored in the library, transmits the generated screen data to the one of the receiving terminals, and sets one of the first type bookmark and the second type bookmark, which is selected by a user using the one of the receiving terminals, for the video and record the one of the first type bookmark and the second type bookmark in the bookmark management module.

6 Claims, 25 Drawing Sheets

(56) References Cited

U.S. PATENT DOCUMENTS

| | | | |
|---|---|---|---|
| 2002/0054062 A1* | 5/2002 | Gerba et al. | 345/716 |
| 2003/0083533 A1* | 5/2003 | Gerba et al. | 585/367 |
| 2005/0166258 A1 | 7/2005 | Vasilevsky et al. | |
| 2007/0283393 A1* | 12/2007 | Kikinis | 725/53 |
| 2008/0005126 A1* | 1/2008 | Sankaran et al. | 707/10 |
| 2008/0060001 A1* | 3/2008 | Logan et al. | 725/34 |
| 2008/0086747 A1* | 4/2008 | Rasanen et al. | 725/46 |
| 2008/0092182 A1* | 4/2008 | Conant | 725/109 |
| 2008/0126919 A1 | 5/2008 | Uskali et al. | |
| 2008/0222295 A1* | 9/2008 | Robinson et al. | 709/227 |
| 2009/0044237 A1* | 2/2009 | Keiter | 725/91 |
| 2009/0164903 A1* | 6/2009 | Patel | 715/721 |
| 2010/0333158 A1* | 12/2010 | McCormack et al. | 725/109 |
| 2012/0278740 A1* | 11/2012 | Robinson et al. | 715/757 |
| 2012/0328263 A1* | 12/2012 | Barton et al. | 386/230 |
| 2013/0018960 A1* | 1/2013 | Knysz et al. | 709/204 |

FOREIGN PATENT DOCUMENTS

| | | |
|---|---|---|
| JP | 2009-159188 A | 7/2009 |
| JP | 4498523 B2 | 4/2010 |
| WO | 03/067594 | 8/2003 |
| WO | 2008/057813 | 5/2008 |

OTHER PUBLICATIONS

Ericsson Inc., "Method for bookmarking web pages of temporary interest", Research Disclosure, Mason Publications, Hampshire, GB, vol. 429, No. 108, Jan. 1, 2000, XP007125393, ISSN: 0374-4353, the whole document.

* cited by examiner

| TERMINAL TYPE ID | TERMINAL TYPE | SCREEN SIZE | INPUT DEVICE TYPE | NETWORK BANDWIDTH | USAGE TIME | USAGE TIME SLOT (HOLIDAY) |
|---|---|---|---|---|---|---|
| 001 | TELEVISION SET | 920 X 480 | REMOTE CONTROL | 100Mbps | 1 HOUR | MOVIES |
| 002 | PC | 800 X 600 | KEYBOARD AND MOUSE | 100Mbps | 2 HOURS | MUSIC |
| 003 | SMARTPHONE | 320 X 480 | TOUCH PANEL | 10Mbps | 30 MINUTES | VARIETY SHOWS |

RECEIVING TERMINAL CHARACTERISTIC INFORMATION

*Fig. 3B*

| USER ID | USER NAME | SEX | BIRTH DATE | ADDRESS | FAVORITE GENRE1 | FAVORITE GENRE2 | FAVORITE GENRE 3 |
|---|---|---|---|---|---|---|---|
| UUU000001 | JOHN SMITH | MALE | 1970/1/1 | TOKYO | SPORTS | | |
| UUU000002 | MARY MILLER | FEMALE | 1980/2/2 | OSAKA | COOKING | | |

2541 / 2542 / 2543 / 2544 / 2545 / 2546 / 2547 254 2548

USER INFORMATION

*Fig. 3D*

| CONTENT ID | TITLE | URL | GENRE | RESOLUTION | BIT RATE | LENGTH | PLAYBACK COUNT | DESCRIPTIONS |
|---|---|---|---|---|---|---|---|---|
| AAA111111 | THREE KINGDOMS | http://www···. | MOVIES | HD | 10MBPS | 120 MIN. | 321 | THREE KINGDOMS IS A CHINESE...... |
| BBB222222 | ENGLISH CONVERSATION FOR BEGINNERS | http://www···. | EDUCATION | SD | 6MBPS | 30 MIN. | 123 | ENGLISH CONVERSATION FOR BEGINNERS ... |

CONTENT MANAGEMENT INFORMATION

*Fig. 3E*

RANKING MANAGEMENT INFORMATION

VIDEO DISTRIBUTION SYSTEM, INFORMATION PROVIDING DEVICE, AND VIDEO INFORMATION PROVIDING METHOD FOR DISTRIBUTING VIDEO TO A PLURALITY OF RECEIVING TERMINALS

CLAIM OF PRIORITY

The present application claims priority from Japanese patent applications JP 2011-274578 filed on Dec. 15, 2011, the content of which is hereby incorporated by reference into this application.

BACKGROUND OF THE INVENTION

This invention relates to a video distribution system for distributing video content such as a moving image, in particular, a method of presenting information on distributed video content.

There is known a video distribution system for distributing video content to terminals through a network. In such a video distribution system, each user is provided with a content list (bookmark list).

The following technologies are proposed as ones that provide the content list in the video distribution system.

For example, JP 2001-243243 A discloses a bookmark list display method including the steps of: sorting titles or URLs of a plurality of websites so that a title or URL of a website that was called last time is placed on top of a bookmark list; and displaying the titles or URLs of the plurality of websites in the sorted order, in which the step of sorting includes sorting, when a website registered in the bookmark list is called, the titles or URLs of the plurality of websites so that the title or URL of the website that was called last time is placed on top of the bookmark list.

Further, JP 2008-262460 A discloses the following technology. Specifically, in the technology, an internal device transmits list information including headings of a plurality of pieces of content to an external device. Then, the external device acquires related content including text information relating to each of the headings included in the list information from content storage means, extracts evaluation basis information indicating at least one of positive evaluations and negative evaluations of the heading from the related content, calculates an evaluation value regarding a piece of content corresponding to each of the headings based on the evaluation basis information, calculates a degree of association between the heading of each piece of content and another heading included in the list information, determines a recommended order representing a display order of the headings based on the evaluation value and the degree of association, and transmits list additional information indicating the recommended order to the internal device. Subsequently, the internal device sorts the headings included in the list information based on the list additional information.

Further, JP 2009-159188 A discloses the following technology. Specifically, in the technology, a screen (terminal) for displaying content and a terminal for performing an operation such as display switching are provided separately from each other. The terminal (such as television set or large-screen display) for the displaying and the terminal (mobile terminal) for the operation are coupled to a server via a network, and the server manages association between the two terminals and the operation.

SUMMARY OF THE INVENTION

However, as mobile terminals and network television sets become widespread, common content may be used by using terminals (such as smartphones, PCs, and TVs) having various screen sizes and network environments. The user uses the terminals in various scenes, and hence different terminals may be used depending on a usage time or a status of the user. Further, content that the user wishes to view may differ depending on the status of the user or the terminal to be used.

Further, the user can view so many content that, when his/her favorite pieces of content are selected from content that can be viewed to set bookmarks that allow access from a plurality of terminals for the pieces of content, the bookmarks are set for many pieces of content, resulting in an enormous volume of bookmark list. Accordingly, it becomes difficult for the user to select content suitable for the status.

It is an object of this invention to provide a bookmark list that enables content desired by a user to be extracted adequately depending on a characteristic of a terminal.

The representative one of inventions disclosed in this application is outlined as follows. There is provided a video distribution system for distributing a video to a plurality of kinds of receiving terminals, the video distribution system comprising a video distribution module for distributing video data stored in a library, a control module for generating screen data for displaying a list of the videos to be distributed to one of the receiving terminals, and a bookmark management module for managing information set for the video. The bookmark management module manages a first type bookmark whose status is not changed by viewing of the video and a second type bookmark whose status is changeable after the viewing of the video. The control module generates screen data that enables one of the first type bookmark and the second type bookmark to be selected with regard to the video stored in the library, transmits the generated screen data to the one of the receiving terminals, and sets one of the first type bookmark and the second type bookmark, which is selected by a user using the one of the receiving terminals, for the video and record the one of the first type bookmark and the second type bookmark in the bookmark management module.

According to the exemplary embodiment of this invention, it is possible to improve convenience of the user by preferentially displaying content for which the second type bookmark is set.

BRIEF DESCRIPTION OF THE DRAWINGS

The present invention can be appreciated by the description which follows in conjunction with the following figures, wherein:

FIG. 3B is a diagram illustrating a configuration example of the receiving terminal characteristic information according to this embodiment;

FIG. 3D is a diagram illustrating a configuration example of the user information according to this embodiment;

FIG. 3E is a diagram illustrating a configuration example of the content management information according to this embodiment;

DETAILED DESCRIPTION OF THE PREFERRED EMBODIMENT

In the following, an embodiment of this invention is described with reference to the accompanying drawings.

(System Configuration)

Figure 1:
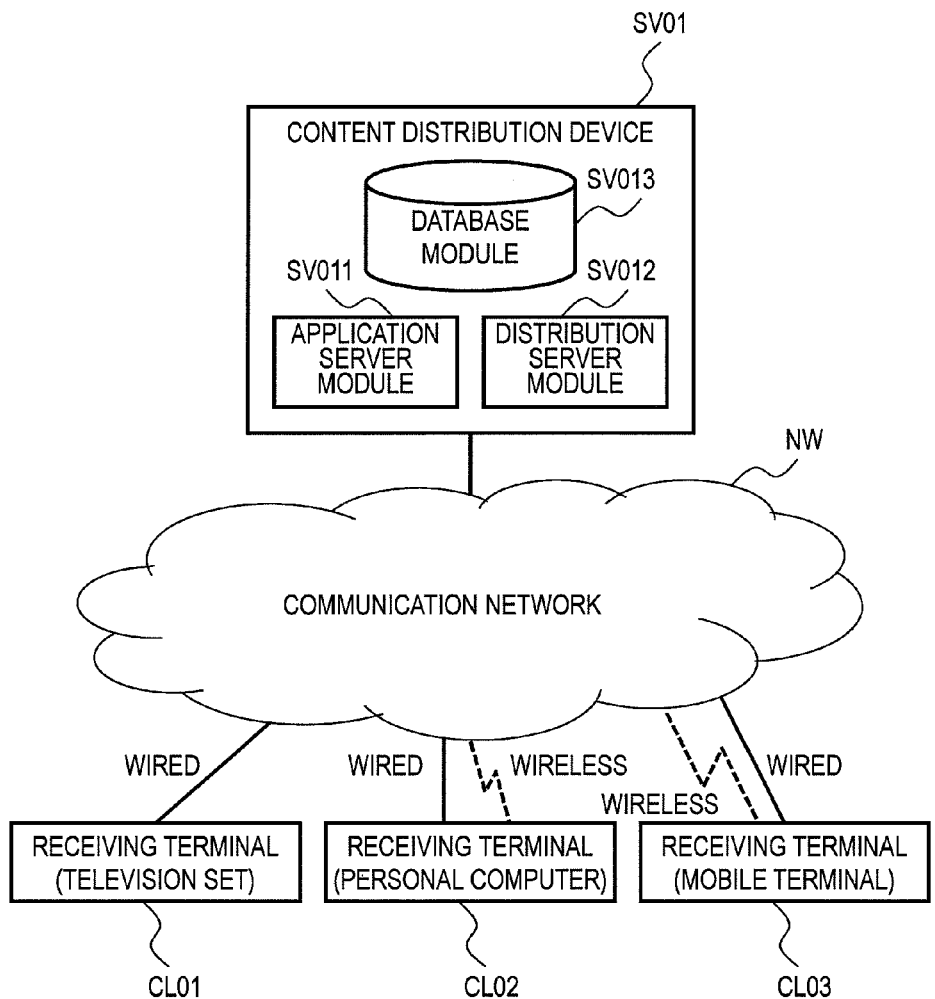
FIG. 1 is a block diagram illustrating a configuration example of a video distribution system according to the embodiment of this invention.

FIG. 1 is a block diagram illustrating a configuration example of a video distribution system according to the embodiment of this invention.

The video distribution system according to this embodiment has a content distribution device SV01. The content distribution device SV01 is coupled to a receiving terminal CL01 or the like through a network NW.

The content distribution device SV01 is a computer (server) including a processor for executing a program, a memory for storing the program executed by the processor and data used in execution of the program, a communication interface for controlling communications to/from another device, and a nonvolatile storage device (for example, hard disk drive) for storing data. The program to be executed by the processor is read from the nonvolatile storage device, loaded into the memory, and executed by the processor.

It should be noted that the program to be executed by the processor is provided through a storage medium (such as CD-ROM or flash memory) or the network. Therefore, the content distribution device SV01 may include an interface for reading the storage medium.

The content distribution device SV01 includes an application server module SV011, a distribution server module SV012, and a database module SV013. The application server module SV011, the distribution server module SV012, and the database module SV013 are systems that operate on at least one computer having a logical or physical configuration. It should be noted that the respective systems may run in separate threads on the same computer.

The application server module SV011 generates a screen to be provided to the receiving terminal CL01 and the like, and transmits the generated screen to the receiving terminal CL01 and the like. The application server module SV011 according to this embodiment includes a bookmark display processing module 200 illustrated in FIG. 2. The distribution server module SV012 transmits video content to be distributed by the content distribution device SV01 to the receiving terminal CL01 and the like. The database module SV013 stores the video content to be distributed by the content distribution device SV01.

The content distribution device SV01 according to this embodiment is coupled to receiving terminals of a plurality of kinds. For example, the receiving terminal CL01 is a television receiver, and is a so-called network television set having a function of displaying a video received via the network on a screen thereof. The receiving terminal CL01 is hereinafter also referred to as "television receiver CL01". Further, a receiving terminal CL02 is a computer including a processor, a memory, and a communication interface. The receiving terminal CL02 uses a browser to display an image (for example, menu screen) transmitted from the content distribution device SV01 on a screen thereof, and uses a video playback program (viewer) to display a video (for example, moving image) transmitted from the content distribution device SV01 on a screen thereof. The receiving terminal CL02 is hereinafter also referred to as "personal computer CL02". Further, a receiving terminal CL03 is a mobile communication terminal such as a smartphone, and displays images (for example, menu screen and moving image) transmitted from the content distribution device SV01 on a screen thereof. The receiving terminal CL03 is hereinafter also referred to as "mobile communication terminal (smartphone) CL03".

Of those receiving terminals, the television receiver CL01 has a large screen size but is operated mainly by using a remote control, and hence a detailed operation thereof is difficult. Further, the personal computer CL02 has a large screen size and is operated by using a keyboard and a mouse, which facilitates the detailed operation. Further, the mobile communication terminal CL03 has a small screen size and is operated by using a touch panel (or numeric keypad), which makes the detailed operation difficult. Therefore, the screen to be transmitted to the receiving terminal and how the screen transitions need to be changed depending on a type of the receiving terminal.

In addition, in comparison among the network environments, the television receiver CL01 is installed in a stationary manner, and is therefore coupled to the network NW in a wired broadband environment (for example, optical network such as PON). In a case of being a desktop type that is installed in the stationary manner, the personal computer CL02 is coupled to the network NW in a wired broadband environment (for example, optical network such as PON). Alternatively, in a case of being a portable laptop type, the receiving terminal CL02 is coupled to the network NW in a wireless communication environment (for example, wireless network such as WiMAX, LTE, or 3G). Further, the mobile communication terminal CL03 is coupled to the network NW in the wireless communication environment (for example, wireless network such as WiMAX, LTE, or 3G). Therefore, an amount of data that can be transmitted differs depending on the type of a terminal.

In addition, the respective terminals differ in use status depending on an installed status. For example, the television receiver CL01 is often used continuously for approximately one hour, and is often used to view content such as movies in the evening, at night, or on holidays. The personal computer CL02 is often used continuously for approximately two hours, and is often used to listen to music in the evening, at night, or on holidays. The mobile communication terminal CL03 is often used for equal to or less than thirty minutes, and is often used to view variety shows on weekdays or on holidays.

It should be noted that such information on characteristics of those receiving terminals is stored in a database as receiving terminal characteristic information 252 illustrated in FIG. 3B.

It should be noted that the television receiver, the personal computer, and the mobile communication terminal (smartphone) are described as examples of the receiving terminal, but in addition thereto, the examples may include a set top box, a BD/DVD/HDD recorder, a PDA, a tablet terminal, a game machine, an in-vehicle/portable navigation device, a kiosk terminal, a teller terminal, and a digital signage device.

Figure 2:
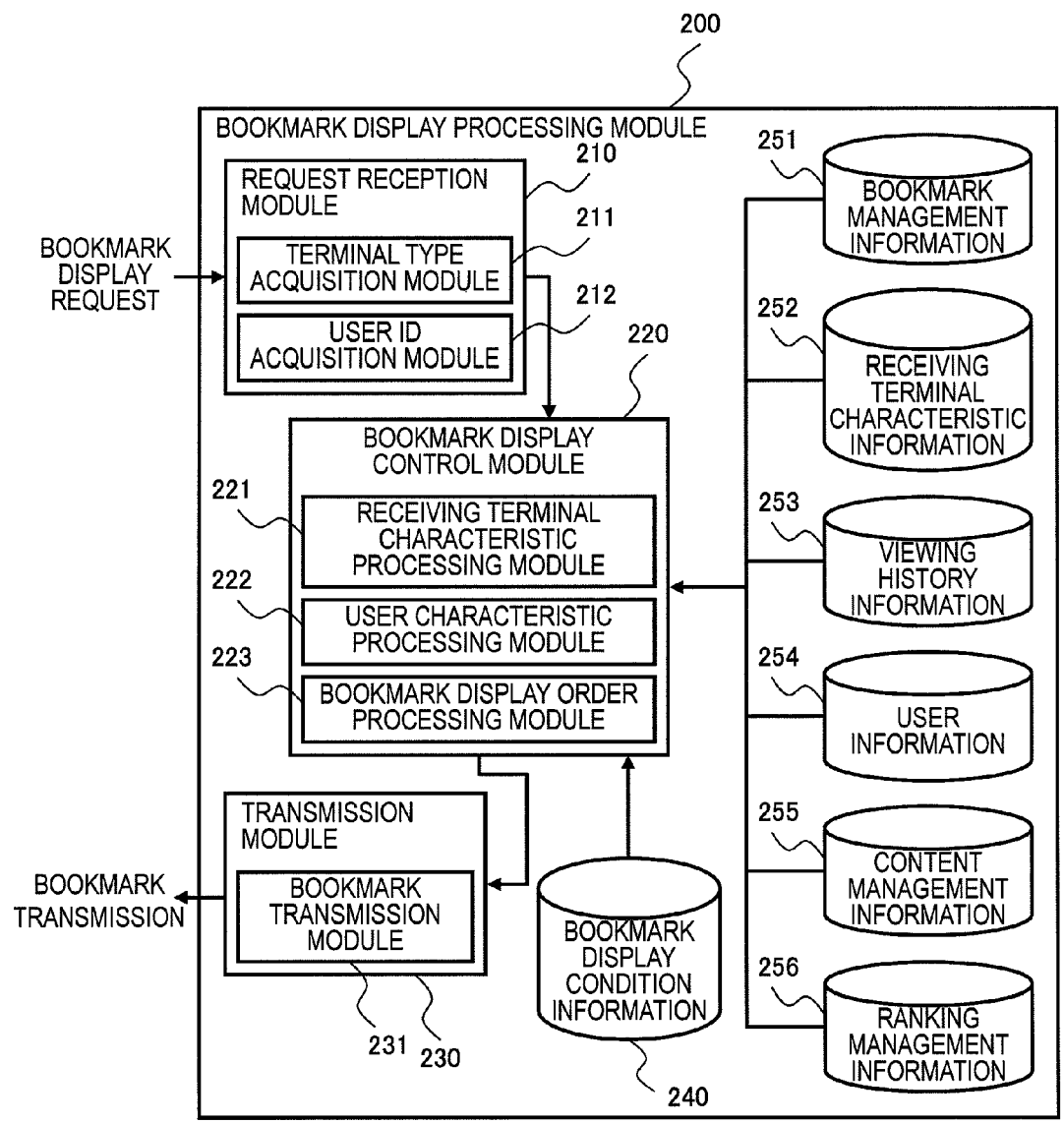
FIG. 2 is a block diagram illustrating a logical configuration example of the bookmark display processing module according to this embodiment.

FIG. 2 is a block diagram illustrating a logical configuration example of the bookmark display processing module 200 according to this embodiment.

As described above, the bookmark display processing module 200 is implemented by the program executed by the application server module SV011.

The bookmark display processing module 200 includes a request reception module 210, a bookmark display control module 220, and a transmission module 230. Further, the bookmark display processing module 200 includes, in a data form, bookmark display condition information 240, bookmark management information 251, the receiving terminal characteristic information 252, viewing history information 253, user information 254, content management information 255, and ranking management information 256.

The request reception module 210 includes a terminal type acquisition module 211 and a user ID acquisition module 212.

The terminal type acquisition module 211 acquires, from a bookmark display request transmitted from the receiving terminal, a terminal type ID of the receiving terminal that has transmitted the bookmark display request. The user ID acquisition module 212 acquires, from the bookmark display request transmitted from the receiving terminal, a user ID of a user of the receiving terminal that has transmitted the bookmark display request (or acquires the user ID acquired at a time of login).

The bookmark display control module 220 includes a receiving terminal characteristic processing module 221, a user characteristic processing module 222, and a bookmark display order processing module 223, and generates a bookmark screen to be transmitted to the receiving terminal.

The receiving terminal characteristic processing module 221 uses the terminal type ID acquired by the terminal type acquisition module 211 to search the receiving terminal characteristic information 252, and acquires characteristic information on the receiving terminal that has requested display of bookmarks. The user characteristic processing module 222 uses the user ID acquired by the user ID acquisition module 212 to search the user information 254, and acquires information on the user of the receiving terminal that has requested the display of the bookmarks.

The bookmark display order processing module 223 refers to the bookmark display condition information 240 based on the characteristic information on the receiving terminal which is acquired by the receiving terminal characteristic processing module 221 and the information on the user which is acquired by the user characteristic processing module 222, and determines a display order of the bookmarks suitable for the receiving terminal and the user.

The transmission module 230 includes a bookmark transmission module 231. The bookmark transmission module 231 based on the display order of the bookmarks which is determined by the bookmark display order processing module 223, and transmits the generated bookmark screen to the receiving terminal that has made a request therefor.

The bookmark display condition information 240 stores conditions and priorities with reference to which the bookmark display order processing module 223 determines the display order of the bookmarks.

Figure 3A:
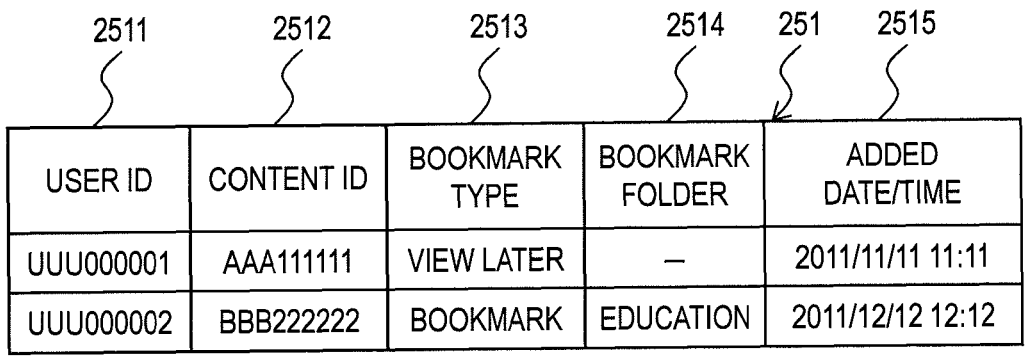
FIG. 3A is a diagram illustrating a configuration example of the bookmark management information according to this embodiment.

FIG. 3A is a diagram illustrating a configuration example of the bookmark management information 251 according to this embodiment.

The bookmark management information 251 is a database for managing the bookmarks registered by the user, and includes information on a user ID 2511, a content ID 2512, a bookmark type 2513, a bookmark folder 2514, and an added date/time 2515.

The user ID 2511 is an identifier of the user who registered the corresponding bookmark. The content ID 2512 is an identifier of bookmarked content. The bookmark type 2513 is information indicating whether this bookmark is a normal bookmark or a "view later" bookmark. The bookmark folder 2514 is a name of a folder into which this bookmark is categorized. The added date/time 2515 is a date/time at which this bookmark was registered.

FIG. 3B is a diagram illustrating a configuration example of the receiving terminal characteristic information 252 according to this embodiment.

The receiving terminal characteristic information 252 is a database for identifying the characteristics of the receiving terminals coupled to the video distribution system according to this embodiment, and includes information on a terminal type ID 2521, a terminal type 2522, a screen size 2523, an input device type 2524, a network bandwidth 2525, a usage time 2526, and a usage time slot (holiday) 2527.

The terminal type ID 2521 is an identifier of the type of the receiving terminal. The terminal type 2522 is a name of the type of the receiving terminal. The screen size 2523 is a screen size (resolution) of the receiving terminal. The input device type 2524 is a type (such as remote control, keyboard, mouse, or touch panel) of an input device included in the receiving terminal. The network bandwidth 2525 is a maximum data transfer rate that is permitted in a case where data is transferred to the receiving terminal. It should be noted that average or effective data transfer rate may be employed for the network bandwidth 2525 instead of the maximum data transfer rate. The usage time 2526 is a time (for example, average time) that is taken when the receiving terminal is used to view the video. The usage time slot (holiday) 2527 is a genre of content that is frequently viewed on the receiving terminal of this type on holidays, and is used to sort the bookmarks so that bookmarks of the content of the registered genre come first in a case where a usage time slot is a holiday.

For example, the receiving terminal having a terminal type ID of 001 is a television receiver whose screen size is 920 dots×480 dots and which can be operated by the remote control. Further, the data transfer rate is 100 Mbps, is used for approximately one hour, and is often used to view movies on holidays.

Figure 3C:
FIG. 3C is a diagram illustrating a configuration example of the viewing history information according to this embodiment.

FIG. 3C is a diagram illustrating a configuration example of the viewing history information 253 according to this embodiment.

The viewing history information 253 is a database for managing a history of viewing of the video which is performed by the user, and includes information on a date/time 2531, a user ID 2532, a content ID 2533, and a stop location 2534.

The date/time 2531 is a date/time (for example, viewing start time stamp or viewing end time stamp of a moving image) at which this content was viewed. The user ID 2532 is an identifier of the user who viewed this content, and is acquired from user information transmitted by the user at the time of login. The content ID 2533 is an identifier of the viewed content (for example, video). The stop location 2534 is a location at which the viewing was interrupted in a case where the user stopped viewing the content midway, and is represented by an elapsed time since the start of the content. It should be noted that a case where the stop location 2534 is not registered means that the user has started viewing this content.

FIG. 3D is a diagram illustrating a configuration example of the user information 254 according to this embodiment.

The user information 254 is a database for managing the users of the video distribution system according to this embodiment, and includes information on a user ID 2541, a user name 2542, a sex 2543, a birth date 2544, an address 2545, and favorite genres 1 to 3 (2546 to 2548).

The user ID 2541 is an identifier of the user of this video distribution system. The user name 2542 is a full name (or nickname) of this user. The sex 2543, the birth date 2544, and the address 2545 are a sex, a birth date, and an address of this user, respectively. It should be noted that the address 2545 may be, for example, a code expressing a residence area instead of a precise address.

The favorite genres 1 to 3 (2546 to 2548) are types of video that are preferred by this user.

The user ID 2541, the user name 2542, the sex 2543, the birth date 2544, and the address 2545 described above are input in user registration performed when the user starts using this video distribution system. It should be noted that the address 2545 may be information estimated from an access path on the network. Further, the favorite genres 1 to 3 (2546 to 2548) may be automatically created from the viewing history information 253.

FIG. 3E is a diagram illustrating a configuration example of the content management information 255 according to this embodiment.

The content management information 255 is a database for managing the video content distributed from the video distribution system according to this embodiment, and includes information on a content ID 2551, a title 2552, a URL 2553, a genre 2554, a resolution 2555, a content bit rate 2556, a length 2557, a playback count 2558, and content descriptions 2559.

The content ID 2551 is an identifier of the video content. The title 2552 is a name of this video content. The URL 2553 is information (such as address or pointer) used for access to this video content. The genre 2554 is a type of this content. The resolution 2555 is a resolution of this content, and is expressed by the number of dots in a matrix. The content bit rate 2556 is a bit rate of this content. The length 2557 is a time required to play back this content. The playback count 2558 is the number of times that this content has been played back by the user. The content descriptions 2559 are metadata for describing details of this content.

Figure 3F:
FIG. 3F is a diagram illustrating a configuration example of the ranking management information according to this embodiment.

FIG. 3F is a diagram illustrating a configuration example of the ranking management information 256 according to this embodiment.

The ranking management information 256 is a database for managing ranking added to the video content distributed from the video distribution system according to this embodiment, and can be generated by, for example, summing up the viewing history information 253 and the user information 254. The ranking management information 256 includes information on a sex 2561 of the user, an age 2562 thereof, a content ID 2563, and a playback count 2564.

The ranking management information 256 illustrated in FIG. 3F manages the ranking in terms of an age zone and a sex.

The sex 2561 of the user and the age 2562 thereof are the sex and the age zone of users corresponding to this ranking, respectively. The content ID 2563 is an identifier of the ranked content. The playback count 2564 is the number of times that this content has been played back by the users of the sex and the age zone.

(Processing Performed in Video Distribution System)

Next, a description is made of processing performed in the video distribution system according to this embodiment.

FIG. 4A to FIG. 4D illustrate a sequence between the receiving terminal CL01 and the content distribution device SV01, but the same sequence is followed to perform processing between the content distribution device SV01 and the receiving terminals CL02 and CL03 and the like of the other types.

Figure 4A:
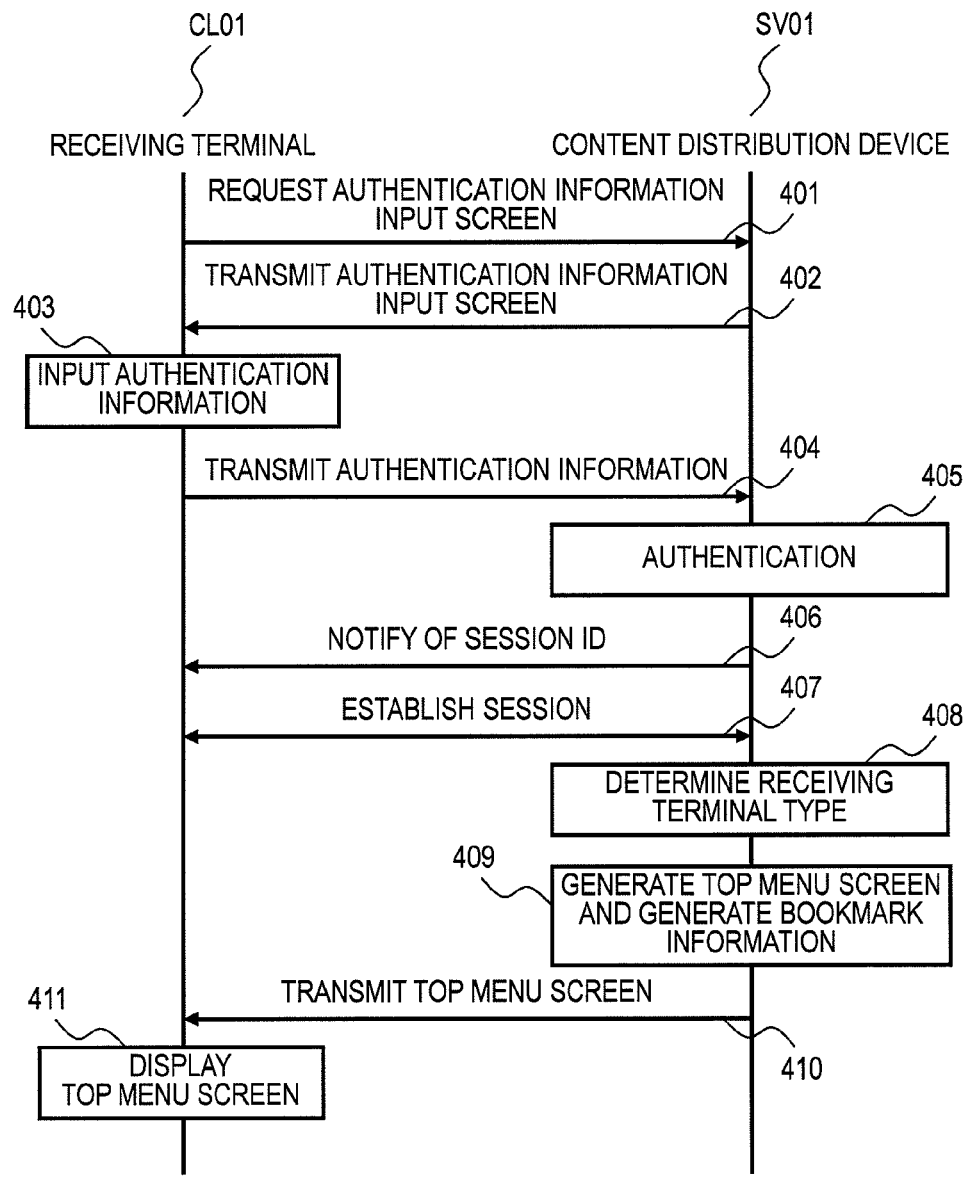
FIG. 4A is a sequence diagram of top menu screen display processing performed in the video distribution system according to this embodiment.

FIG. 4A is a sequence diagram of top menu screen display processing performed in the video distribution system according to this embodiment.

First, when the user starts a screen reception program (for example, browser) on the receiving terminal CL01 to request display of an authentication information input screen (login screen), the receiving terminal CL01 transmits an authentication information input screen request to the content distribution device SV01 (401). This authentication information input screen request includes the terminal type ID.

When the content distribution device SV01 receives an authentication information input screen request 401, the AP server module SV011 identifies the type of the receiving terminal CL01 from the terminal type ID included in the authentication information input screen request, and transmits the authentication information input screen suitable for the receiving terminal CL01 to the receiving terminal CL01 that has requested the authentication information input screen (402).

The receiving terminal CL01 displays the transmitted authentication information input screen on a display unit. The user inputs authentication information (user ID and password) on the authentication information input screen displayed on the receiving terminal CL01 (403).

The receiving terminal CL01 transmits the input authentication information to the content distribution device SV01 (404). It should be noted that the receiving terminal CL01 transmits the terminal type ID of the receiving terminal to the content distribution device SV01 along with the authentication information.

When receiving the authentication information from the receiving terminal CL01, the content distribution device SV01 performs authentication processing for comparing the received authentication information with the authentication information stored in a storage device and determining whether or not the authentication has been successful (405).

When the authentication has been successful as a result of the authentication processing 405, the content distribution device SV01 notifies the receiving terminal CL01 of a session ID used for a session to be established with respect to the receiving terminal CL01 (406), and the content distribution device SV01 and the receiving terminal CL01 establish the session therebetween (407).

Figure 7:
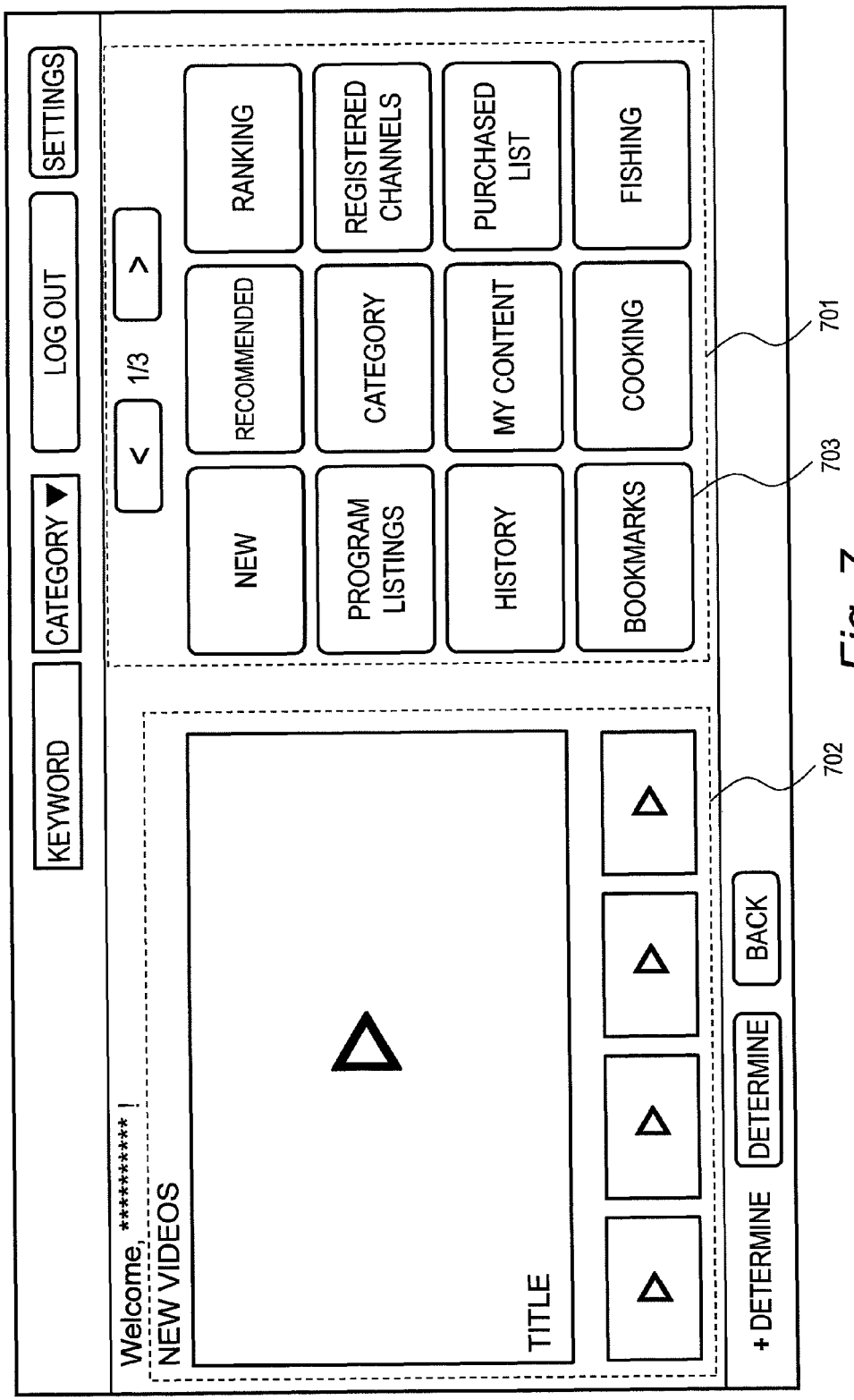
FIG. 7 is the explanatory diagram of the top menu screen displayed on the television receiver.
Figure 11:
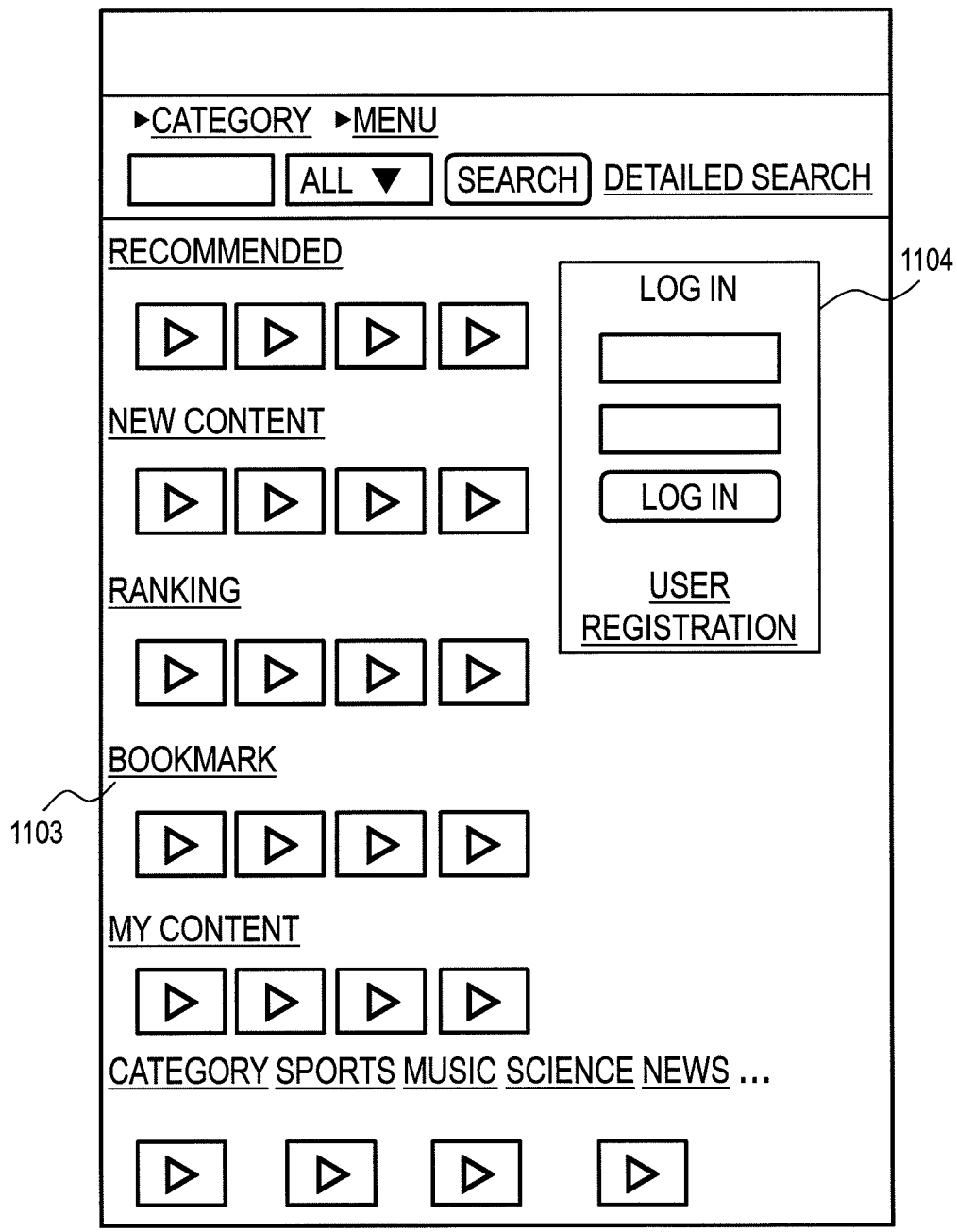
FIG. 11 is the explanatory diagram of the top menu screen displayed on the personal computer.
Figure 14:
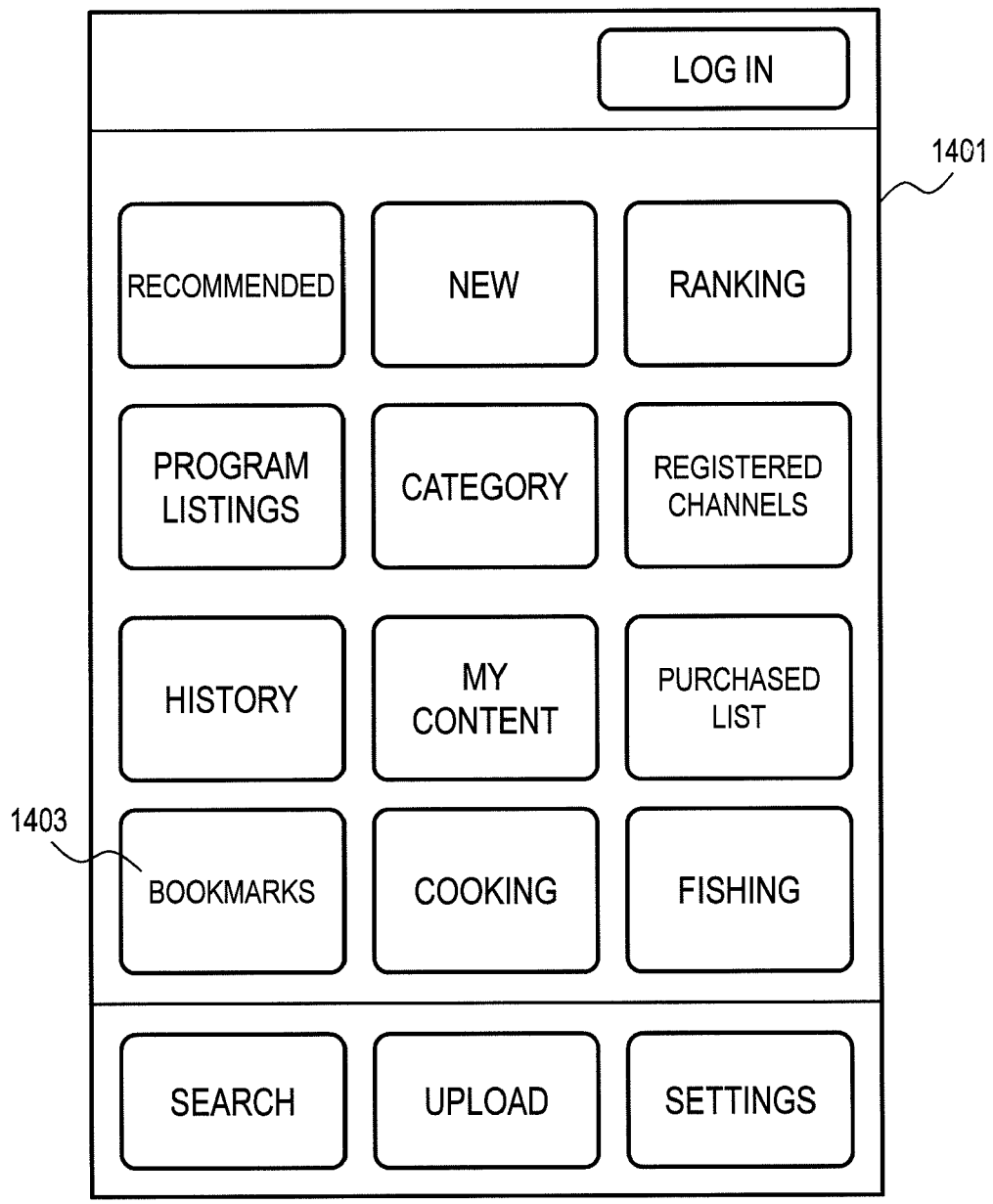
FIG. 14 is the explanatory diagram of the top menu screen displayed on the smartphone.

The content distribution device SV01 uses the terminal type ID transmitted from the receiving terminal CL01 to search the receiving terminal characteristic information 252, acquires the information on the characteristic of the receiving terminal CL01 to determine the type of the receiving terminal (408), generates a top menu screen illustrated in, for example, FIG. 7, FIG. 11, and FIG. 14 (409), and transmits the generated top menu screen illustrated in FIG. 7 to the receiving terminal CL01 (411). It should be noted that, for example, in a case where the top menu screen includes information on the bookmark as illustrated in FIG. 11, the information on the bookmark is generated in Step 409. In this case, the display order of the bookmarks is determined by bookmark display order determining processing illustrated in FIG. 5.

The receiving terminal CL01 displays the received top menu screen (412). The top menu screen displayed on the receiving terminal is a screen illustrated in FIG. 7 on the television receiver CL01, a screen illustrated in FIG. 11 on the personal computer CL02, and a screen illustrated in FIG. 14 on the smartphone CL03.

It should be noted that FIG. 4A illustrates the example in which the top menu screen is different from the authentication information input screen (login screen), but as illustrated in FIG. 11, the top menu screen and the authentication information input screen may be one screen by providing an authentication information input field to the top menu screen.

Figure 4B:
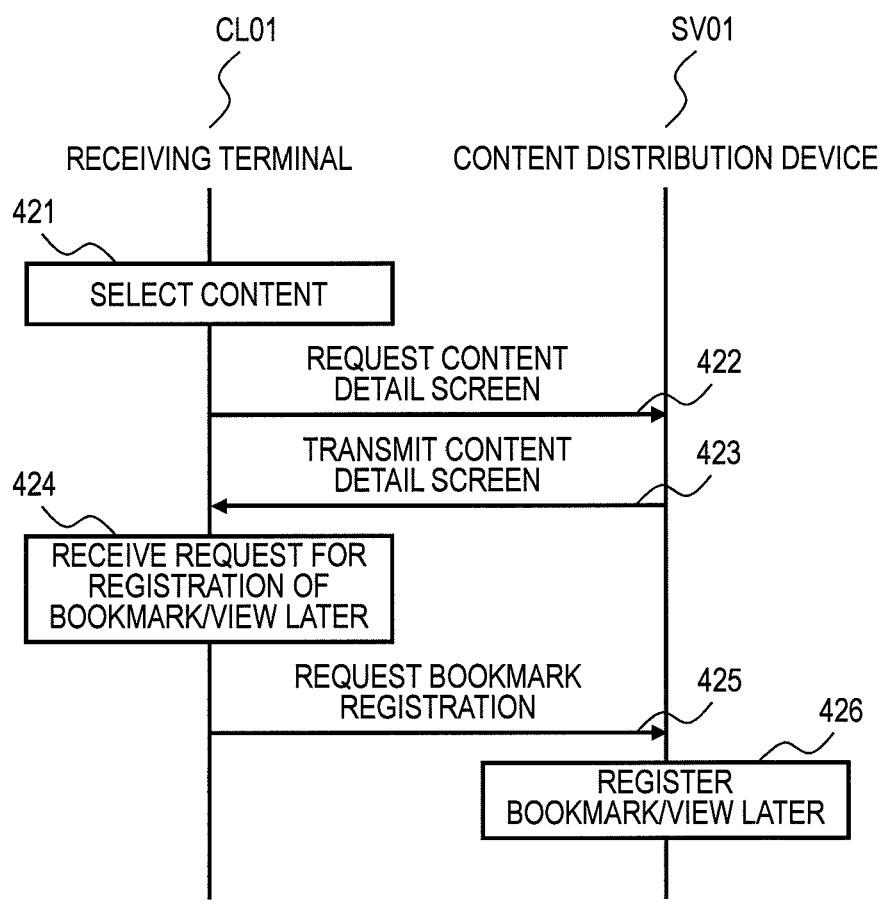
FIG. 4B is a sequence diagram of bookmark registration processing performed in the video distribution system according to this embodiment.

FIG. 4B is a sequence diagram of bookmark registration processing performed in the video distribution system according to this embodiment.

First, the receiving terminal CL01 displays a content list by an operation of the user, and receives the user's selection of the content (421). Then, the receiving terminal CL01 transmits a content detail screen request including a content ID of the selected content to the content distribution device SV01 (422).

Figure 9:
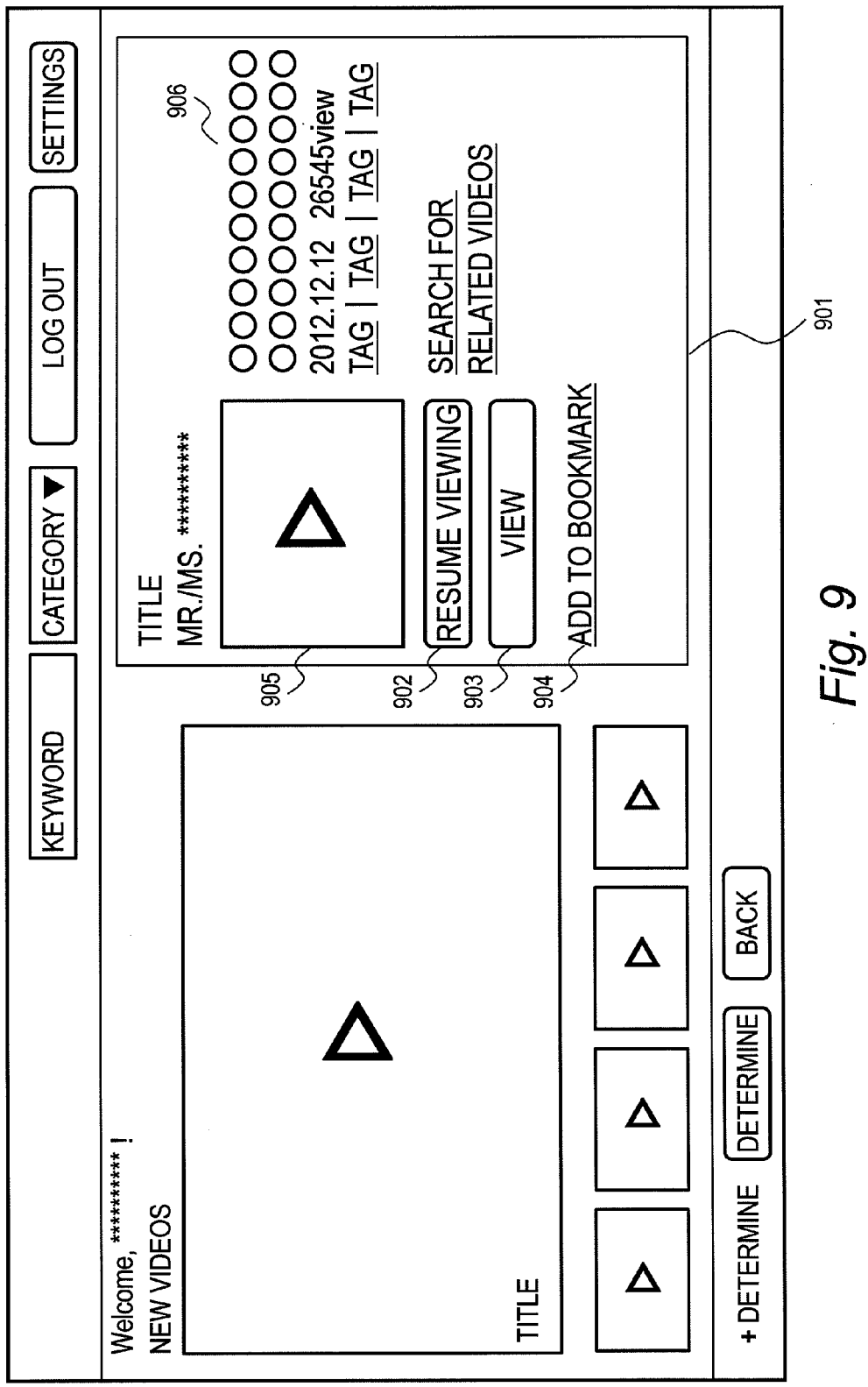
FIG. 9 is the explanatory diagram of the content detail screen displayed on the television receiver.
Figure 16:
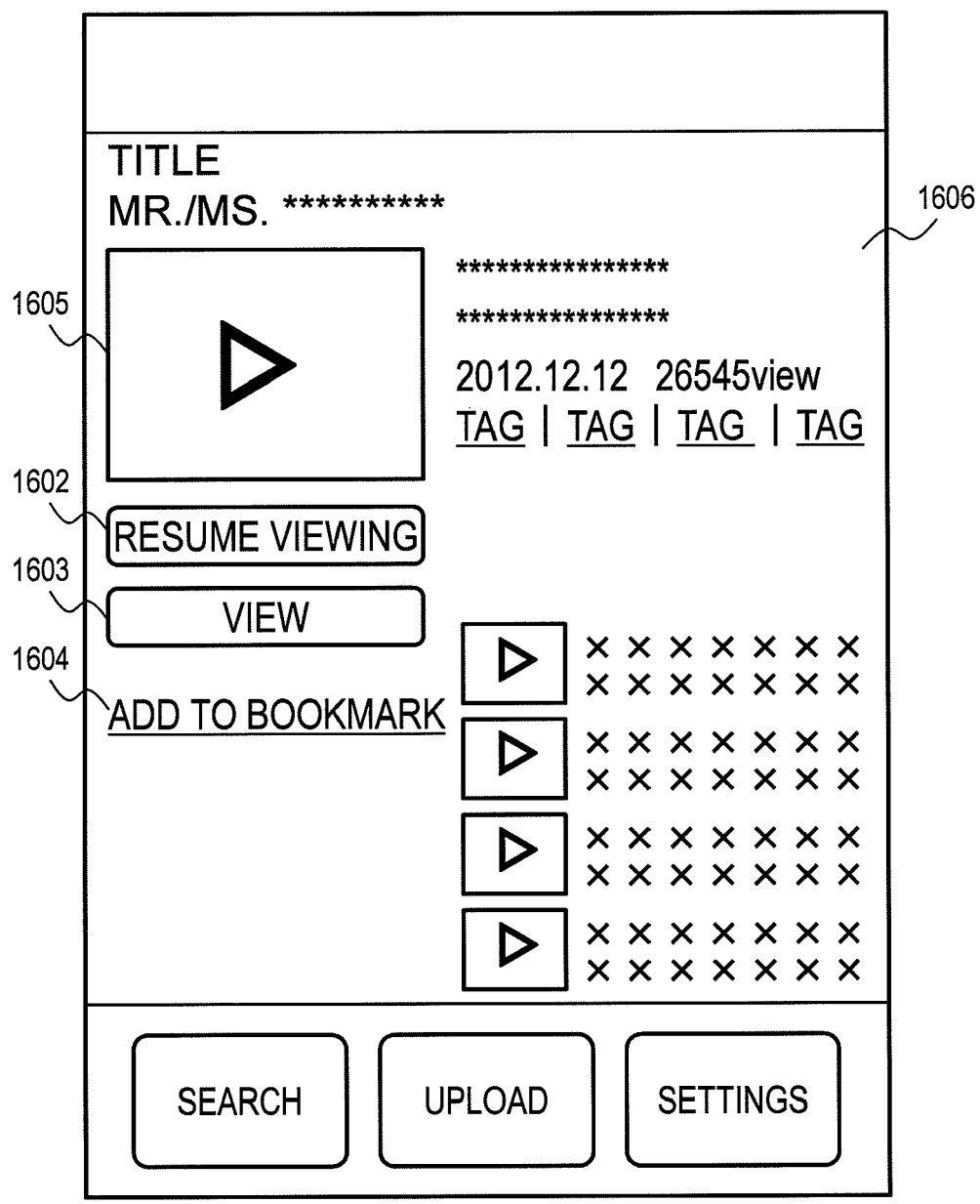
FIG. 16 is the explanatory diagram of the content detail screen displayed on the smartphone.

When the content distribution device SV01 receives a content detail screen request 422, the AP server module SV011 generates a content detail screen illustrated in, for example, FIG. 9 and FIG. 16 which corresponds to the content ID included in the received content detail screen request 422, and transmits the generated content detail screen illustrated in FIG. 9 to the receiving terminal CL01 (423).

The receiving terminal CL01 displays the received content detail screen. The content detail screen includes an area illustrated as, for example, 904 in FIGS. 9 and 1604 in FIG. 16 which is operated in order to start a bookmark registration operation. The receiving terminal CL01 displays a bookmark registration screen illustrated in, for example, FIG. 17 by the operation of the user, receives the user's input of the type ("bookmark" or "view later") of the bookmark illustrated as, for example, 1702 and 1703 in FIG. 17 and a designation (not shown) of the folder in which the bookmark is to be stored (424), and transmits a bookmark registration request to the content distribution device SV01, the bookmark registration request including the user ID of the user who has requested bookmark registration, the content ID of the content, the type of the selected bookmark, and the folder in which the bookmark is to be stored (425).

When receiving the bookmark registration request, the content distribution device SV01 extracts the user ID, the content ID, the type of the bookmark, and the information on the folder from the bookmark registration request, and registers the bookmark whose registration has been requested in the bookmark management information 251 (426).

Figure 4C:
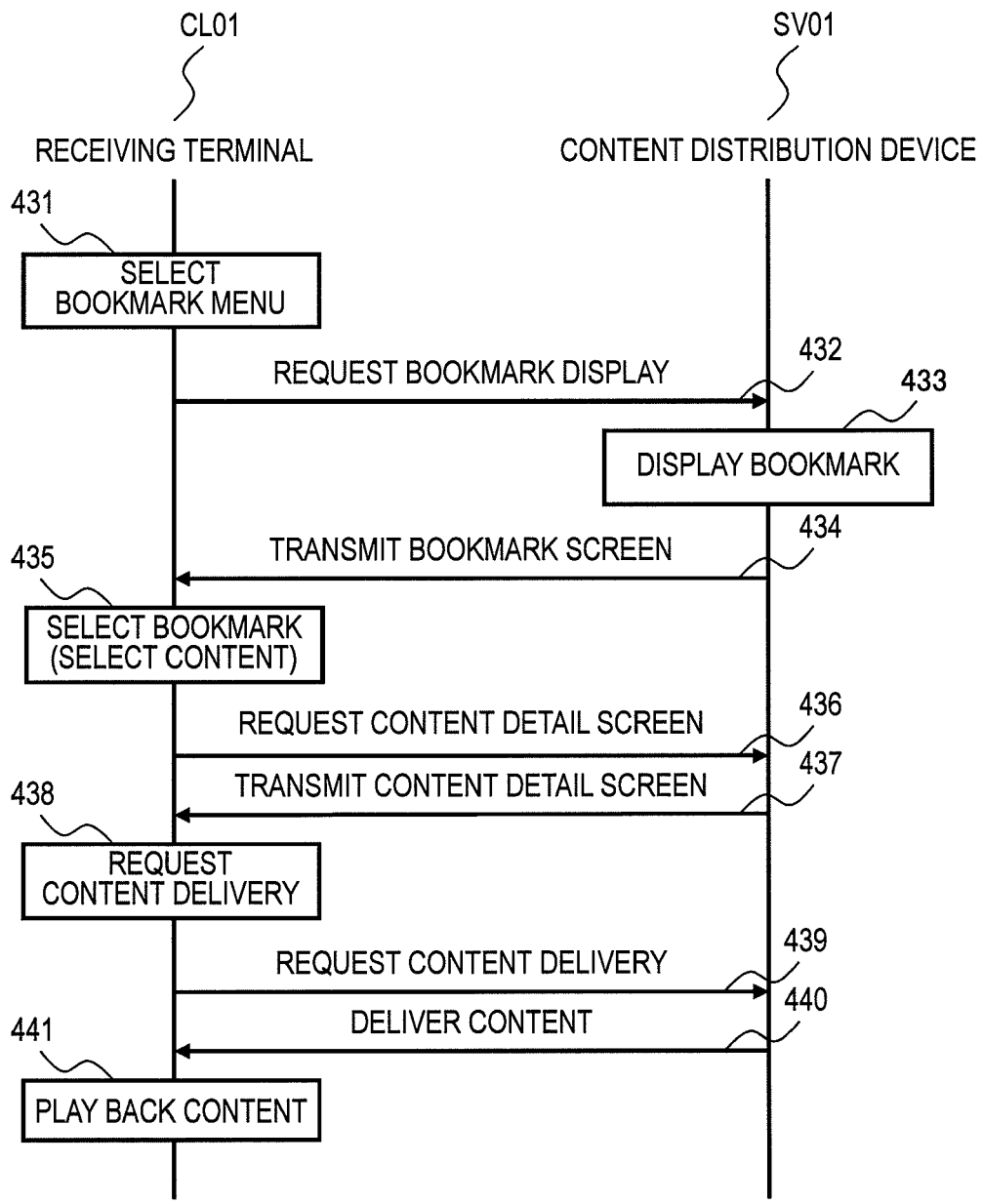
FIG. 4C is a sequence diagram of content playback processing performed in the video distribution system according to this embodiment.

FIG. 4C is a sequence diagram of content playback processing performed in the video distribution system according to this embodiment, and illustrates processing for selecting the bookmark and playing back the content.

First, when the user selects a bookmark menu on the receiving terminal CL01 (431), the receiving terminal CL01 transmits the bookmark display request including the terminal type ID of the receiving terminal CL01 and the user ID of the user to the content distribution device SV01 (432).

It should be noted that when the user performs an operation for requesting the bookmark of another user (clicks on "friends' bookmarks" 1202 in FIG. 12), the transmitted bookmark display request includes another user ID.

Figure 8:
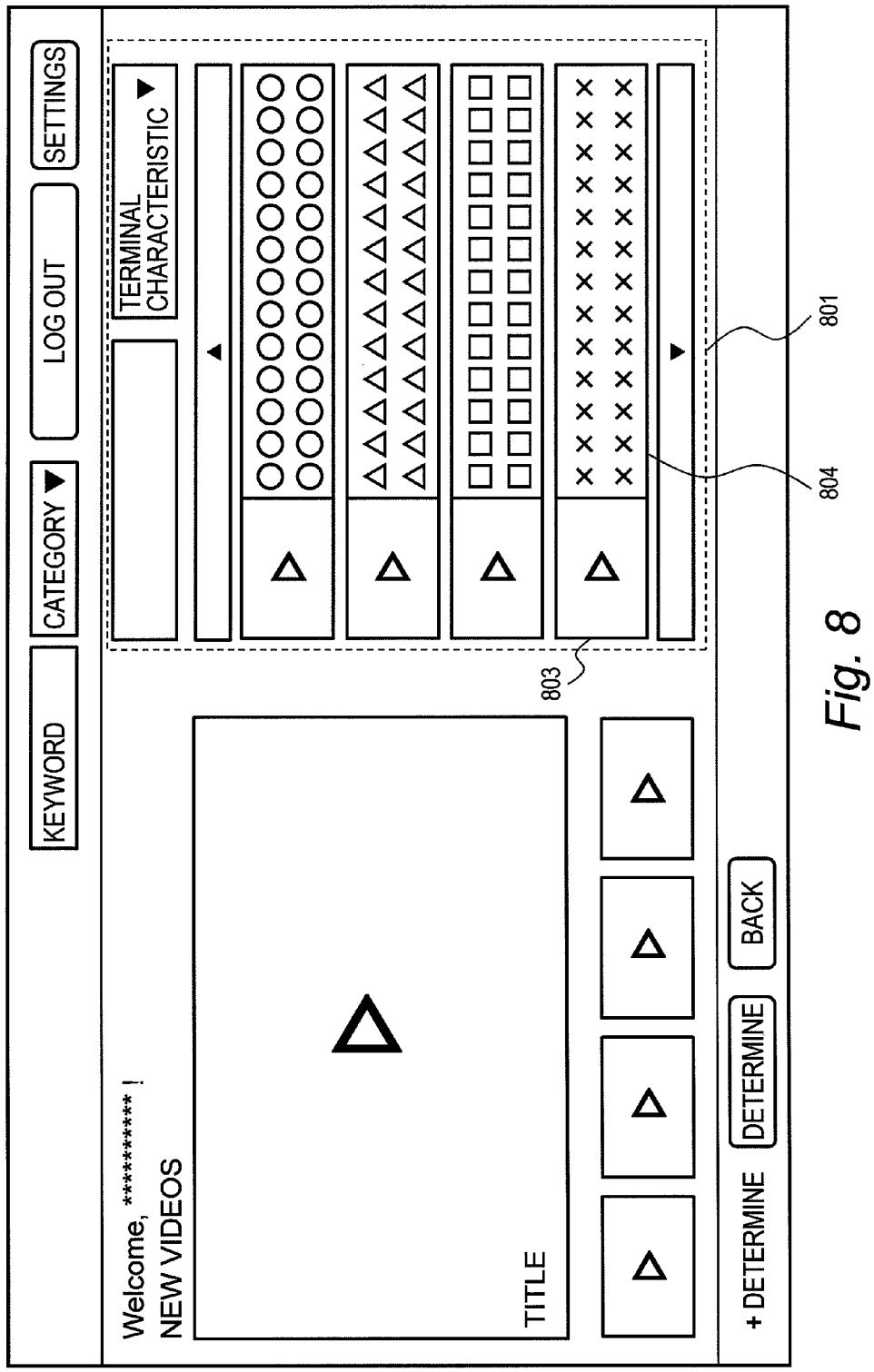
FIG. 8 is the explanatory diagram of the bookmark screen displayed on the television receiver.
Figure 12:
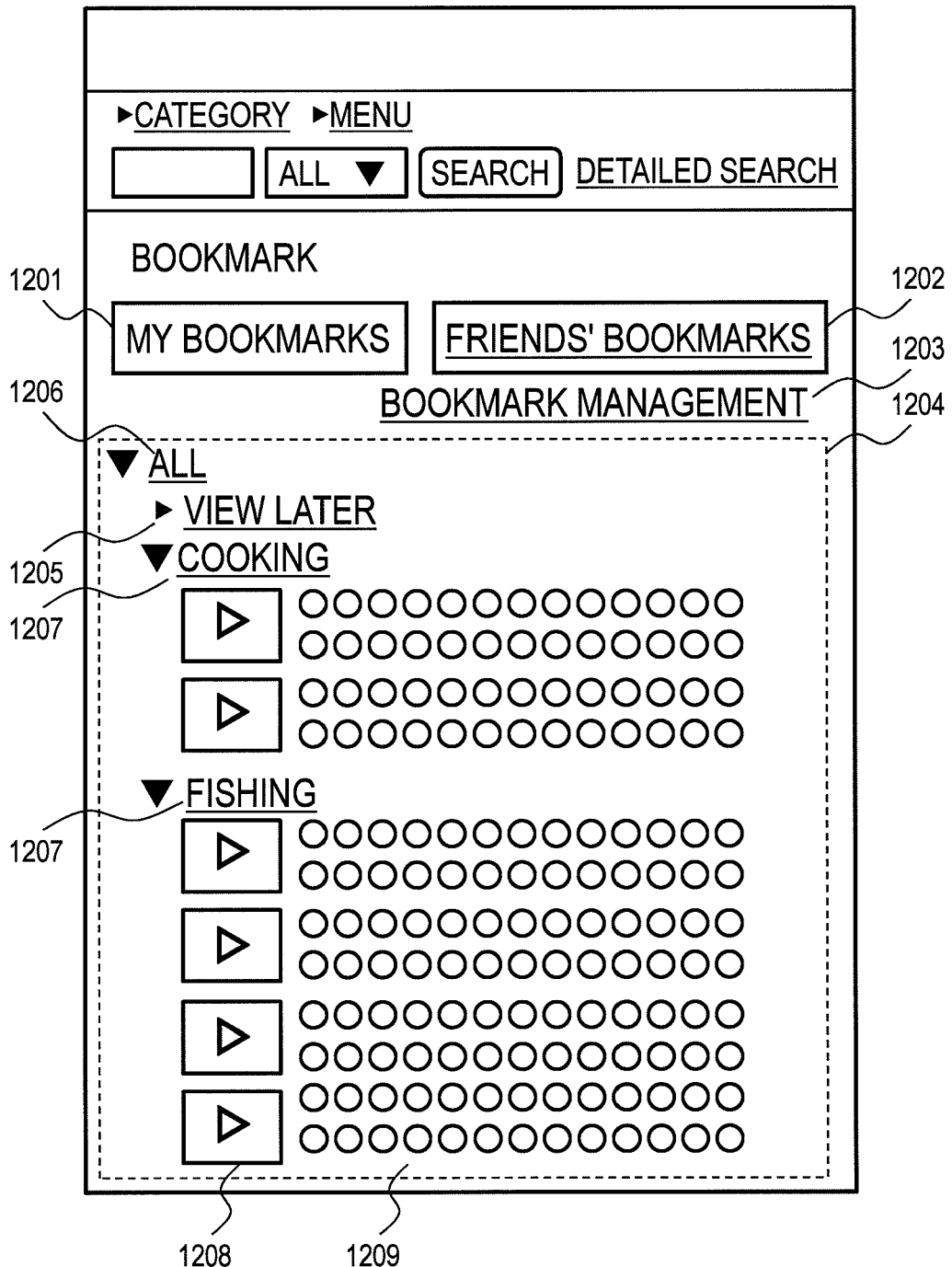
FIG. 12 is the explanatory diagram of the bookmark screen displayed on the personal computer.
Figure 15:
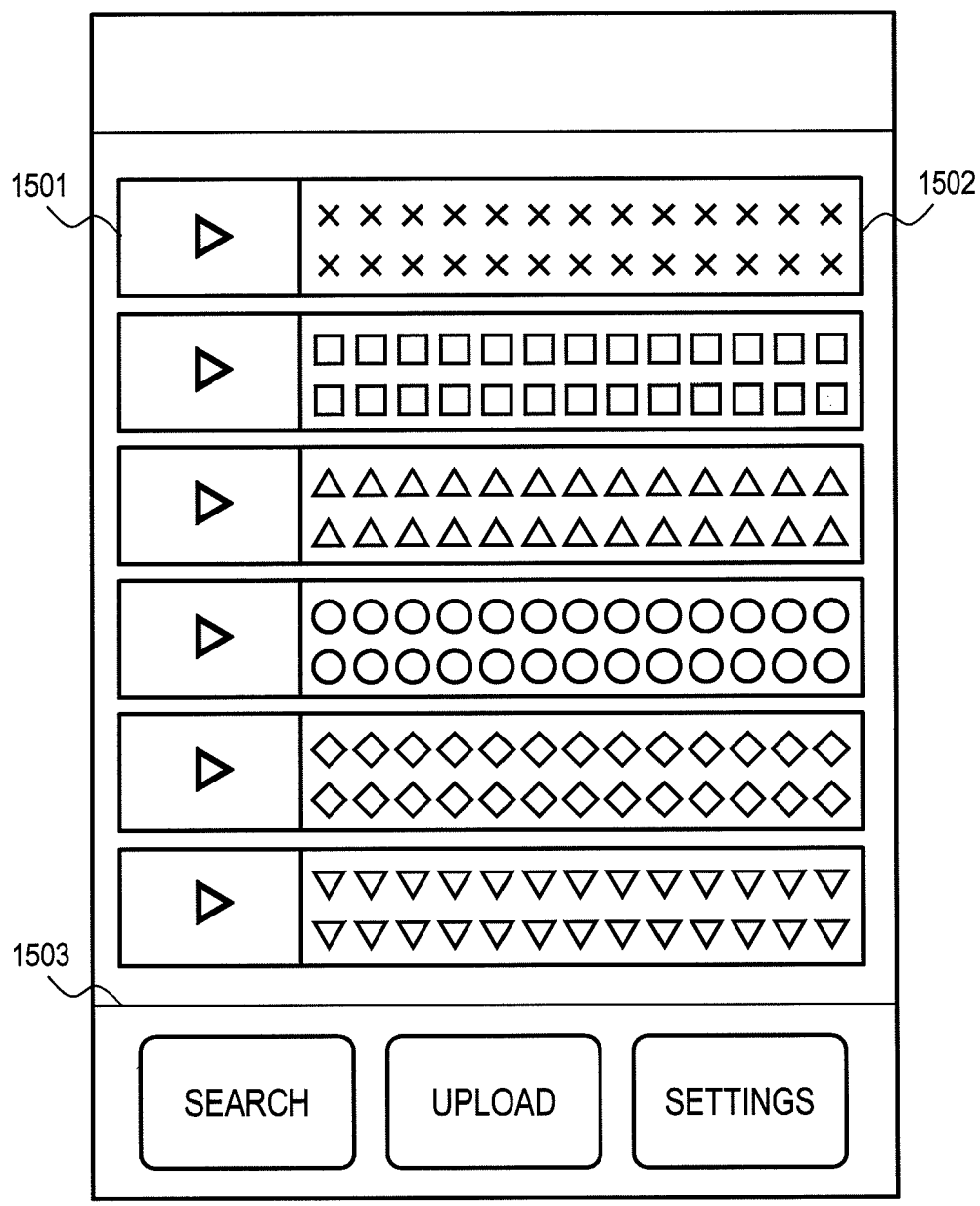
FIG. 15 is the explanatory diagram of the bookmark screen displayed on the smartphone.

The content distribution device SV01 uses the user ID included in the received bookmark display request to execute bookmark display processing including the bookmark display order determination processing, generates the bookmark screen illustrated in, for example, FIG. 8, FIG. 12, and FIG. 15 (433), and transmits the generated bookmark screen illustrated in FIG. 8 to the receiving terminal CL01 (434). The bookmark display order determining processing is described in detail with reference to FIG. 5.

The receiving terminal CL01 displays the received bookmark screen, receives the user's selection of the content displayed on the bookmark screen (435), and transmits the content detail screen request including the content ID of the selected content to the content distribution device SV01 (436).

The content distribution device SV01 generates the content detail screen for the content having the content ID included in the received content detail screen request, and transmits the generated content detail screen to the receiving terminal CL01 (437).

The receiving terminal CL01 displays the received content detail screen illustrated in, for example, FIG. 9 and FIG. 16. The content detail screen includes an area illustrated as, for example, a "view" button 903 in FIG. 9 and a "view" button 1603 in FIG. 16 which is operated in order to allow the user to view the content. When receiving the user's operation for viewing (438), the receiving terminal CL01 transmits a content delivery request including the ID of the content whose delivery is requested to the content distribution device SV01 (439). The content distribution device SV01 reads, from the database module SV013, the content having the content ID included in the received content delivery request, and delivers the read content to the receiving terminal CL01 (440).

Then, the receiving terminal CL01 starts the viewer, and plays back the delivered content (441).

Figure 4D:
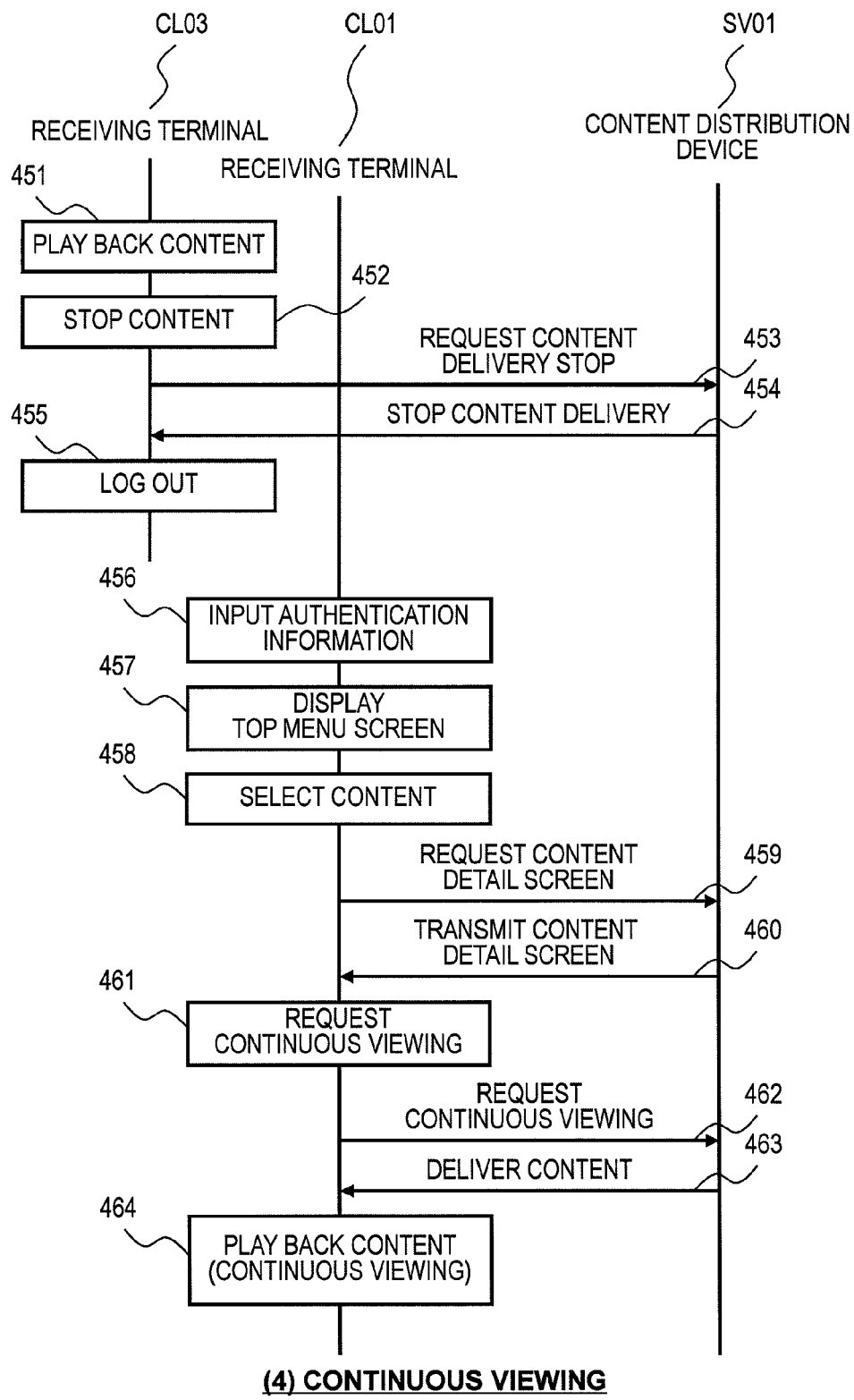
FIG. 4D is a sequence diagram of continuous viewing processing performed in the video distribution system according to this embodiment.

FIG. 4D is a sequence diagram of continuous viewing processing performed in the video distribution system according to this embodiment, and illustrates processing for selecting the bookmark and playing back the content from midway.

First, the receiving terminal CL03 starts the viewer, and plays back the content delivered from the content distribution device SV01 in accordance with an instruction issued by the user (451).

Further, the receiving terminal CL03 stops playing back the content delivered from the content distribution device SV01 in accordance with a playback stopping instruction issued by the user (452), and transmits a content delivery stop request including the information on a playback stop location (453).

When receiving the content delivery stop request, the content distribution device SV01 transmits a content delivery stop signal to stop transmitting the content data (454). The content distribution device SV01 records the information on the playback stop location included in the content delivery stop request in the stop location 2534 of the viewing history information 253.

After that, when receiving a logout operation from the user, the receiving terminal CL03 disconnects the session that has been established with respect to the content distribution device SV01 (455).

After that, the user starts a video distribution program on another receiving terminal (for example, the television receiver CL01), displays the authentication information input screen (login screen), and inputs the authentication information (user ID and password) on the authentication information input screen (456). Then, when the authentication has been successful on the content distribution device SV01, the receiving terminal CL01 displays the top menu screen (457). This processing from the login up to the top menu screen display is the same as the processing illustrated in FIG. 4A, and hence the detailed description thereof is omitted.

After that, the receiving terminal CL01 displays the content list, and receives the user's selection of the content (458). The receiving terminal CL01 transmits the content detail screen request including the content ID of the selected content to the content distribution device SV01 (459).

When the content distribution device SV01 receives a content detail screen request 459, the AP server module SV011 generates the content detail screen illustrated in, for example, FIG. 9 and FIG. 16 which corresponds to the content ID included in the received content detail screen request 459, and transmits the generated content detail screen illustrated in FIG. 9 to the receiving terminal CL01 (460).

The receiving terminal CL01 displays the received content detail screen. The content detail screen includes an area illustrated as, for example, a "resume viewing" button 902 in FIG. 9 and a "resume viewing" button 1602 in FIG. 16 which is operated in order to resume the viewing from the location at which the viewing was interrupted before. When receiving the user's operation for continuous viewing (461), the receiving terminal CL01 transmits a continuous viewing request including the content ID of the content whose delivery is requested to the content distribution device SV01 (462).

The content distribution device SV01 uses the content ID included in the received content delivery request and the acquired user ID to acquire the stop location 2534 from the viewing history information 253 on the content, reads the data starting at the acquired stop location of the content having the content ID from the database module SV013, and delivers the read content (463).

Then, the receiving terminal CL01 starts the viewer, and plays back the delivered content from the location at which the viewing was interrupted last time (464).

When the viewing of the content is finished, and when the "view later" bookmark is set for the content, the receiving terminal CL01 executes processing performed after the viewing of the content illustrated in FIG. 6. It should be noted that the processing performed after the viewing of the content illustrated in FIG. 6 may be executed only after the content has been viewed through to the end.

Figure 5:
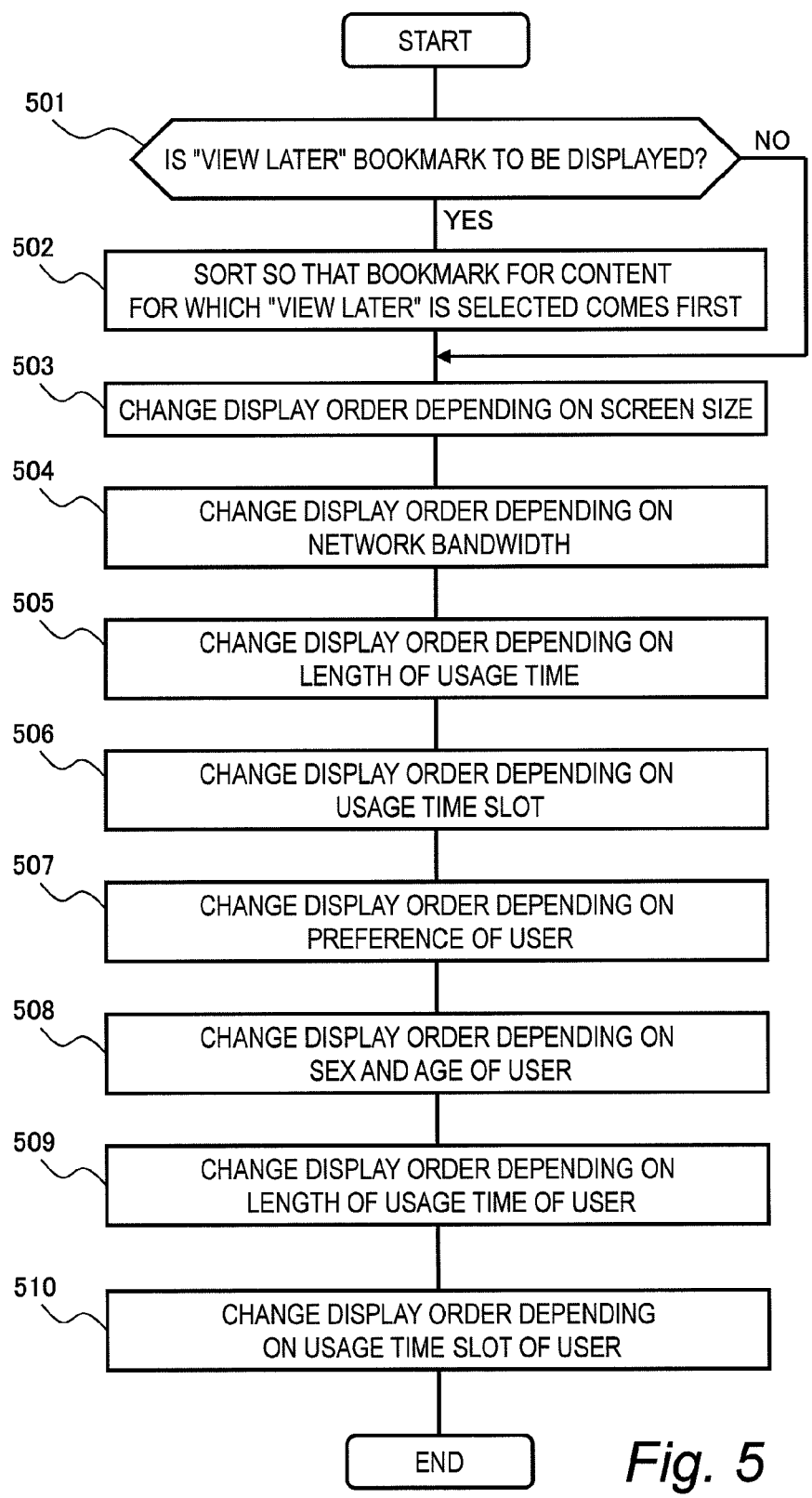
FIG. 5 is a flowchart of the bookmark display order determination processing performed in the video distribution system according to this embodiment.

FIG. 5 is a flowchart of the bookmark display order determination processing performed in the video distribution system according to this embodiment. This bookmark display order determination processing is executed by the bookmark display control module 220 (bookmark display order processing module 223) at reception of the bookmark display request as illustrated in, for example, Step 433 of FIG. 4C and Step 409 of FIG. 4A.

First, the bookmark display order processing module 223 uses the user ID included in the bookmark display request to search the bookmark management information 251, acquires data on the bookmarks of the user, and acquires a condition for determining the display order of the bookmarks from the bookmark display condition information 240.

After that, the bookmark display order processing module 223 uses the terminal type ID included in the bookmark display request to refer to the receiving terminal characteristic information 252, and acquires the characteristic information on the terminal that has transmitted the bookmark display request. Then, the acquired characteristic information on the terminal and the condition acquired from the bookmark display condition information 240 are compared with each other to determine whether or not the terminal displays the "view later" bookmark (501). For example, it is possible to determine based on the terminal type 2522 whether or not to display the "view later" bookmark. As a more specific example, it is possible to determine that the "view later" bookmark is to be displayed when the terminal type 2522 is "television set" and that the "view later" bookmark is not to be displayed when the terminal is of another type. Further, it is possible to determine that the "view later" bookmark is to be displayed when the screen size 2523 is larger than a predetermined size and that the "view later" bookmark is not to be displayed when the screen size 2523 is smaller than the predetermined size.

After that, the bookmark display order processing module 223 uses the bookmark type 2513 among pieces of data acquired from the bookmark management information 251 to sort the bookmarks so that the bookmarks having a bookmark type of "view later" come first (502).

After that, the bookmark display order processing module 223 sorts the bookmarks based on the characteristic of the receiving terminal. First, the terminal type ID of the receiving terminal that has requested bookmark display is used to refer to the receiving terminal characteristic information 252, and the information on the receiving terminal is acquired.

Then, the bookmark display order processing module 223 compares the screen size 2523 acquired from the receiving terminal characteristic information 252 with the resolution 2555 acquired from the content management information 255, extracts the bookmarks of the content having a smaller resolution than the screen size of the receiving terminal, and sorts the bookmarks so that the bookmarks of the content having a smaller resolution than the screen size of the receiving terminal are positioned in a higher level than the bookmarks of the content having a larger resolution. It should be noted that the bookmarks of the content having a smaller resolution than the screen size of the receiving terminal are sorted in descending order of the resolution of the content, while the bookmarks of the content having a larger resolution than the screen size of the receiving terminal are sorted in ascending order of the resolution of the content (503).

In this case, the user can view the content comfortably by transmitting, by the content distribution device SV01, the content having a larger resolution than the screen size of the receiving terminal after resizing the resolution of the content into the screen size of the receiving terminal or by using the viewer to resize the resolution of the content.

Subsequently, the bookmark display order processing module 223 compares the network bandwidth 2525 acquired from the receiving terminal characteristic information 252 with the content bit rate 2556 acquired from the content management information 255, extracts the bookmarks of the content having a lower content bit rate than a network bandwidth of the receiving terminal, and sorts the bookmarks so that the bookmarks of the content having a lower content bit rate than a network bandwidth of the receiving terminal are positioned in a higher level than the bookmarks of the content having a higher content bit rate. It should be noted that the bookmarks of the content having a lower content bit rate than the network bandwidth of the receiving terminal are sorted in descending order of the content bit rate, while the bookmarks of the content having a higher content bit rate than a network bandwidth of the receiving terminal are sorted in ascending order of the content bit rate (504).

Subsequently, the bookmark display order processing module 223 compares the usage time 2526 acquired from the receiving terminal characteristic information 252 with the length 2557 acquired from the content management information 255, extracts the bookmarks of the content shorter than the use time of the receiving terminal, and sorts the bookmarks so that the bookmarks of the content shorter than the use time of the receiving terminal are positioned in a higher level than the bookmarks of the longer content. It should be noted that the bookmarks of the content shorter than the use time of the receiving terminal are sorted in descending order of the length of the content, while the bookmarks of the content longer than the use time of the receiving terminal are sorted in ascending order of the length of the content (505).

Subsequently, the bookmark display order processing module 223 compares the usage time slot 2527 acquired from the receiving terminal characteristic information 252 with the genre 2554 acquired from the content management information 255, and sorts the bookmarks so that the bookmarks of the content of a genre that is frequently viewed on the receiving terminal come first (506).

According to the processing of Steps 503 to 506, the bookmarks of the content that is not suitable for the characteristic of the receiving terminal are displayed last, which can reduce opportunities to view the content that is not suitable for the characteristic of the receiving terminal.

After that, the bookmark display order processing module 223 sorts the bookmarks based on the characteristic of the user. First, the bookmark display order processing module 223 uses the user ID of the user who has requested the bookmark display to refer to the user information 254, and acquires the information on the user.

Then, the bookmark display order processing module 223 compares the favorite genres 1 to 3 (2546 to 2548) acquired from the user information 254 with the genre 2554 acquired from the content management information 255, and sorts the bookmarks so that the bookmarks of the content whose genre matches a preference of the user come first (507).

Subsequently, the bookmark display order processing module 223 compares the sex 2543 and the birth date 2544 acquired from the user information 254 with the sex 2561 and the age 2562 acquired from the ranking management information 256, and sorts the bookmarks so that the bookmarks of the content the sex and age of the user of which match the sex and age of the user who has viewed the ranked content come first (508).

Subsequently, the bookmark display order processing module 223 acquires a viewing history of the user from the viewing history information 253. Then, the length 2557 corresponding to the content ID acquired from the viewing history information 253 is acquired from the content management information 255, and a viewing time is analyzed from a length of the content that has been viewed by the user. It should be noted that the viewing time may be any one of a mean value and a maximum value of the viewing time of the user. Then, the analyzed viewing time is compared with the length 2557 of the content acquired from the content management information 255, and the bookmarks are sorted so that the bookmarks of the content shorter than the analyzed viewing time come first (509).

Subsequently, the bookmark display order processing module 223 acquires the viewing history of the user from the viewing history information 253, and analyzes a time slot in which the user often performs the viewing from the acquired viewed date/time. Further, the viewing histories of all the users are acquired from the viewing history information 253, and the content viewed in the time slot that matches the analyzed viewing time slot of the user is extracted. Then, the bookmarks are sorted so that the extracted content among the bookmarks to be displayed comes first (510).

According to the processing of Steps 507 to 510, it is possible to increase the opportunities to view the content suitable for a viewing behavior of the user.

The sorting of the bookmarks described above in Steps 502 to 510 is processed so that the sorting processed earlier has a higher priority and the sorting processed later has a lower priority. In other words, the bookmarks positioned in the same level as a result of the sorting processed earlier are sorted in accordance with a rule processed later. It should be noted that an application order of those sorting rules may be changed depending on the characteristic of the terminal.

Further, with regard to the sorting rules described in Steps 503 to 510, all the rules may be applied, or at least one rule may be selectively applied.

In the bookmark display order determination processing described above, the display order is determined so that the bookmarks that do not match the characteristic of the receiving terminal or the characteristic of the user are positioned in a low level, but control may be performed so that the bookmarks that do not match the characteristic of the receiving terminal or the characteristic of the user are not displayed.

For example, in Step 503, only the bookmarks of the content having a smaller resolution than the screen size of the receiving terminal may be sorted while excluding the bookmarks of the content having a larger resolution than the screen size of the receiving terminal. In this manner, only the bookmarks of the content that can be viewed comfortably can be displayed by excluding the content that overflows the screen of the receiving terminal.

Further, in Step 504, only the bookmarks of the content having a lower content bit rate than the network bandwidth of the receiving terminal may be sorted, and the bookmarks of the content having a higher content bit rate than the network bandwidth of the receiving terminal may be excluded. In this manner, it is possible to display only the bookmarks of the content that can be viewed comfortably without experiencing dropping frames or the like on the receiving terminal.

Further, in Step 505, only the bookmarks of the content shorter than the use time of the receiving terminal may be sorted while excluding the bookmarks of the content longer than the use time of the receiving terminal. In this manner, it is possible to display only the bookmarks of the content suitable for a mode of using the receiving terminal.

Further, in Step 506, only the bookmarks of the content of a genre that is frequently viewed on the receiving terminal may be sorted while excluding the bookmarks of the content of a genre that is not so frequently viewed on the receiving terminal. In this manner, it is possible to display only the bookmarks of the content suitable for the mode of using the receiving terminal.

Further, in Step 507, only the bookmarks of the content whose genre matches the preference of the user may be sorted while excluding the bookmarks of the content whose genre does not match the preference of the user. In this manner, it is possible to display only the bookmarks of the content suitable for the preference of the user.

Further, in Step 508, only the bookmarks of the content the sex and age of the user of which match the sex and age of the user who has performed the viewing may be sorted while excluding the bookmarks of the content the sex and age of the user of which do not match the sex and age of the user who has performed the viewing. In this manner, it is possible to display only the bookmarks of the content suitable for the preference of the user.

Further, in Step 509, only the bookmarks of the content shorter than the analyzed viewing time may be sorted while excluding the bookmarks of the content longer than the analyzed viewing time. In this manner, it is possible to display only the bookmarks of the content suitable for the preference of the user.

As described above, in the bookmark display order determination processing, the display order or display contents are determined based on the difference in the kind of bookmark (view later, normal bookmark), the characteristics (screen size, network bandwidth, length of usage time, and usage time slot) of the receiving terminal, and the characteristics (preference, sex, age, length of usage time, and usage time slot) of the user, and hence it is possible to display the bookmarks optimal for the user.

Figure 6:
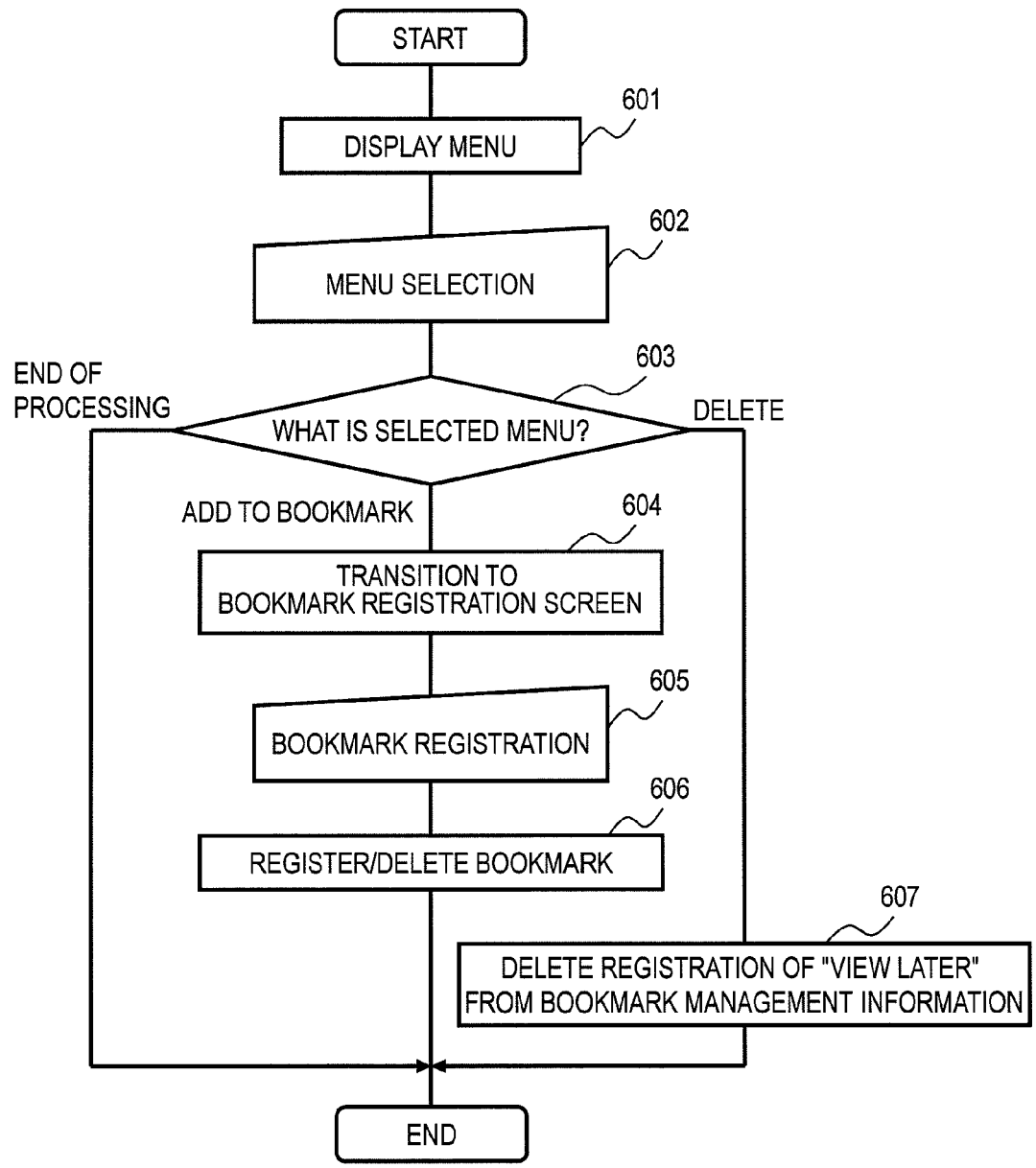
FIG. 6 is a flowchart of processing performed after the viewing of content in the video distribution system according to this embodiment.

FIG. 6 is a flowchart of processing performed after the viewing of content in the video distribution system according to this embodiment, and illustrates processing performed after the viewing of the content for which the "view later" bookmark is set.

The processing illustrated in FIG. 6 is exemplified by one that is executed by the receiving terminal CL01, but the same processing is performed on the receiving terminals CL02 and CL03 and the like of the other types.

When the viewing of the content for which the "view later" bookmark is set is finished, the receiving terminal CL01 starts the processing illustrated in FIG. 6, and displays a bookmark selection menu screen illustrated in, for example, FIG. 10 (601). The receiving terminal CL01 receives a selection operation from the user (602), and causes the processing to branch off based on the selection received from the user (603).

When the processing selected by the user is "continue view later", there is no need to update the bookmark management information 251, and hence this processing is brought to an end.

On the other hand, when the processing selected by the user is "add to bookmark", the bookmark registration screen request is transmitted to the content distribution device SV01, the bookmark registration screen is received from the content distribution device SV01, and the received bookmark registration screen is displayed (604).

The receiving terminal CL01 receives the user's input of the type ("bookmark" or "view later") of the bookmark and the designation of the folder in which the bookmark is to be stored (605), and transmits a bookmark registration/deletion request including the user ID of the user who has requested the bookmark registration, the content ID of this content, the type of the selected bookmark, and the folder in which the bookmark is to be stored, to the content distribution device SV01 (606).

When receiving the bookmark registration/deletion request, the content distribution device SV01 extracts the user ID, the content ID, the type of the bookmark, and the folder for the storage from the bookmark registration request, and registers the bookmark in the bookmark management information 251. Further, data on the "view later" bookmark is deleted from the bookmark management information 251.

It should be noted that when "add to bookmark" is selected, the bookmark type 2513 may be changed from "bookmark" to "view later" while maintaining the other information on the bookmark management information 251 as it is.

On the other hand, when the processing selected by the user is "delete", a bookmark deletion request including the user ID and the content ID is transmitted to the content distribution device SV01, and the data on the "view later" bookmark is deleted from the bookmark management information 251 (607).

The "view later" bookmark stores information indicating that the content for which this bookmark is set is to be viewed later, and loses its value as the "view later" bookmark after the viewing of this content is finished. Therefore, the processing for the "view later" bookmark after the viewing of the content is important. Therefore, in this embodiment, the user is prompted to select any one of "continue view later", "add to bookmark", and "delete", and the "view later" bookmark that has lost its value is made use of.

It should be noted that, after the viewing of the content, the "view later" bookmark may be deleted without asking the user to process the "view later" bookmark.

(Screen Structure)

Figure 13:
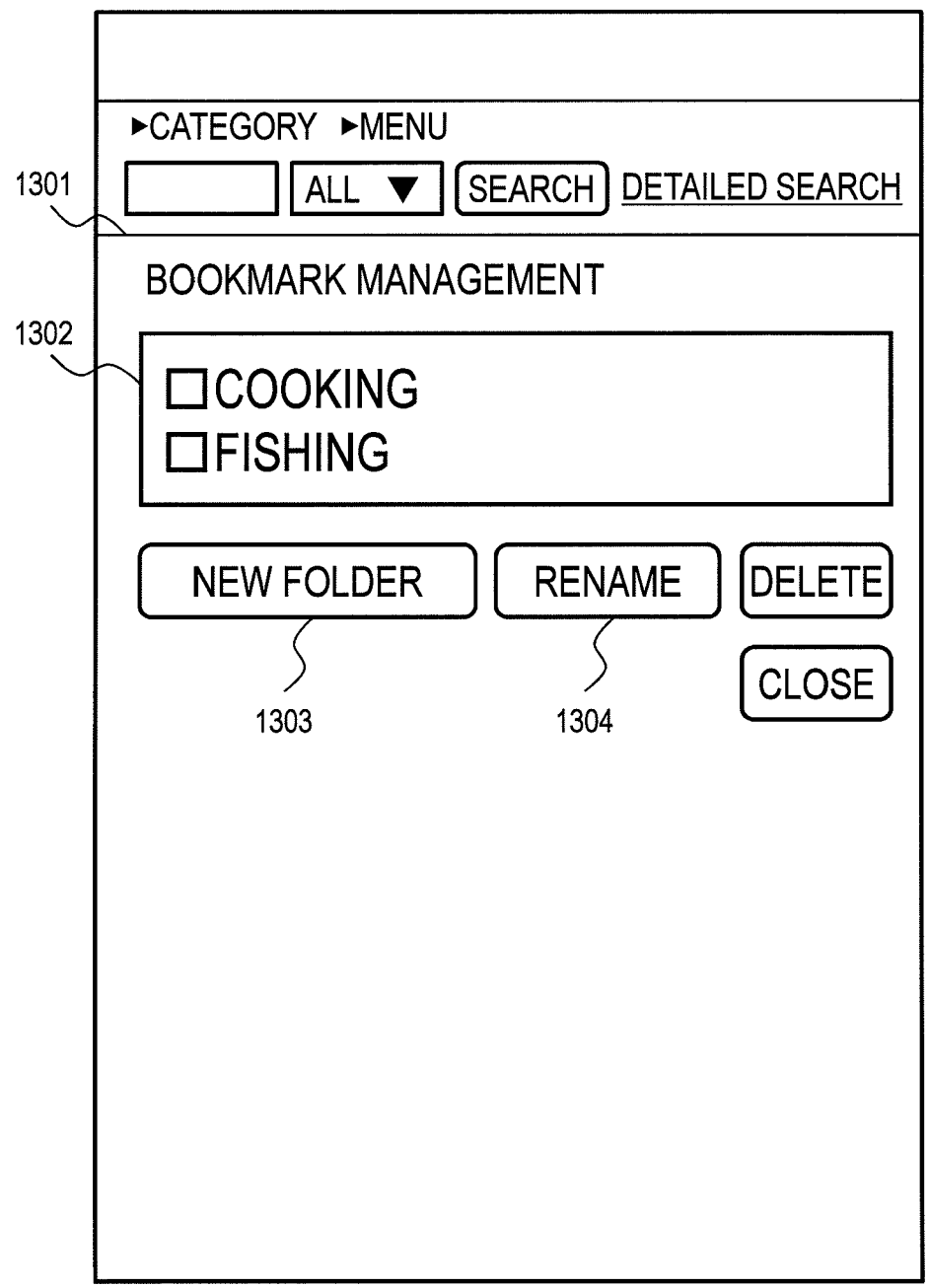
FIG. 13 is the explanatory diagram of the bookmark management screen displayed on the personal computer.

Next described are screens displayed on the terminals coupled to the video distribution system according to this embodiment. FIG. 7 to FIG. 10 are explanatory diagrams of the screens displayed on the television receiver CL01, FIG. 11 to FIG. 13 are explanatory diagrams of the screens displayed on the personal computer CL02, and FIG. 14 to FIG. 17 are explanatory diagrams of the screens displayed on the smartphone CL03.

(Screen Displayed on Television Receiver CL01)

FIG. 7 is the explanatory diagram of the top menu screen displayed on the television receiver CL01.

The television receiver CL01 has a large screen size, and hence a large amount of information can be displayed thereon. Therefore, the top menu screen for the television receiver CL01 includes a menu area 701 including buttons for selecting the screen to be displayed next and an area 702 for introducing new videos. The menu area 701 includes a bookmark display button 703 for transitioning to the bookmark screen illustrated in FIG. 8.

FIG. 8 is the explanatory diagram of the bookmark screen displayed on the television receiver CL01.

When the user selects the bookmark display button 703 on the top menu screen illustrated in FIG. 7 to request the display of the bookmarks as illustrated in Step 432 of FIG. 4C, the bookmark screen is displayed.

The bookmark screen for the television receiver CL01 includes a bookmark display area 801 on the right half of the screen. The bookmark display area 801 includes a thumbnail image 803 of the content for which the bookmark is set and content descriptions 804 thereof. The content descriptions 804 can be acquired from the content management information 255, but may be required from a metadata server coupled to the video distribution system according to this embodiment.

It should be noted that, on the television receiver CL01, the screen for displaying the normal bookmark and the screen for displaying the "view later" bookmark may be of the same format.

FIG. 9 is the explanatory diagram of the content detail screen displayed on the television receiver CL01.

When the user selects the content on the top menu screen illustrated in FIG. 7 or the bookmark screen illustrated in FIG. 8 to request the display of detailed information on the content as illustrated in Step 422 of FIG. 4B, Step 436 of FIG. 4C, and Step 459 of FIG. 4D, the content detail screen is displayed.

The content detail screen for the television receiver CL01 includes a content information display area 901 on the right half of the screen. The content information display area 901 includes a thumbnail image 905 of this content, content descriptions 906 thereof, a "resume viewing" button 902, a "view" button 903, and a bookmark registration button 904.

The "resume viewing" button 902 is an area operated in order to view this content from the location at which the viewing was interrupted before. The "view" button 903 is an area operated in order to view this content from the beginning. The bookmark registration button 904 is an area operated in order to set the bookmark for this content.

Figure 10:
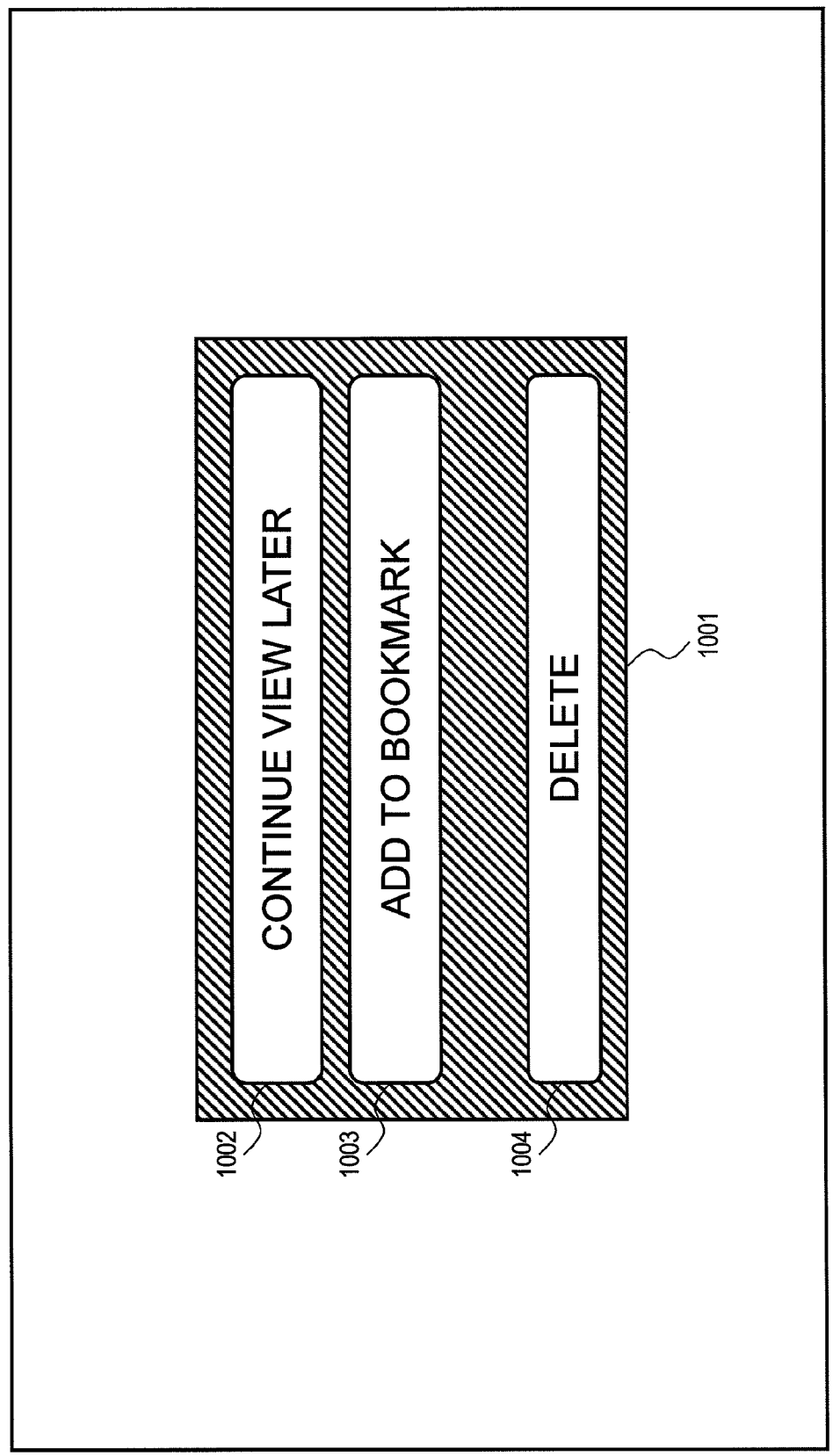
FIG. 10 is the explanatory diagram of the bookmark selection menu screen displayed on the television receiver.

FIG. 10 is the explanatory diagram of the bookmark selection menu screen displayed on the television receiver CL01. A bookmark selection menu screen 1001 illustrated in FIG. 10 is displayed when the viewing of the content for which the "view later" bookmark is set is finished as illustrated in, for example, Step 601 of FIG. 6.

The bookmark selection menu screen 1001 includes a "continue view later" button 1002, an "add to bookmark" button 1003, and a "delete" button 1004.

The "continue view later" button 1002 is an area operated in a case of maintaining the "view later" bookmark as it is. The "add to bookmark" button 1003 is an area operated in order to display the bookmark registration screen in a case of switching the "view later" bookmark to the normal bookmark. The "delete" button 1004 is an area operated in a case where there is no need to save the "view later" bookmark.

(Screen Displayed on Personal Computer CL02)

FIG. 11 is the explanatory diagram of the top menu screen displayed on the personal computer CL02.

The personal computer CL02 has a large screen size and it is easy to use the personal computer CL02 in screen scroll operation. Accordingly, the personal computer CL02 can display a large amount of information on one screen. Therefore, the top menu screen for the personal computer CL02 includes menu buttons for selecting the screen to be displayed next and an area for introducing recommended videos. The menu buttons includes a bookmark display button 1103 for transitioning to the bookmark screen illustrated in FIG. 12.

Further, the top menu screen displayed on the personal computer CL02 includes an area 1104 for inputting the authentication information to be used for login to the video distribution system according to this embodiment.

FIG. 12 is the explanatory diagram of the bookmark screen displayed on the personal computer CL02. The bookmark screen illustrated in FIG. 12 displays the bookmarks set by the user.

When the user clicks on the bookmark display button 1103 on the top menu screen illustrated in FIG. 11 to request the display of the bookmarks as illustrated in Step 432 of FIG. 4C, the bookmark screen is displayed.

The bookmark screen for the personal computer CL02 includes buttons 1201 and 1202 for selecting a person who has set the bookmarks, a bookmark management button 1203, a bookmark display area 1204, and buttons 1205, 1206, and 1207 for selecting the type of bookmark to be displayed.

The button (my bookmarks) 1201 for selecting the person who has set the bookmarks is an area operated in order to display the bookmarks set by the user, and the button (friends' bookmarks) 1202 for selecting the person who has set the bookmarks is an area operated in order to display the bookmarks set by another person. The bookmark management button 1203 is an area operated in order to transition to a bookmark management screen illustrated in FIG. 13. The button (view later) 1205 for selecting the type of bookmark is an area operated in order to display only the "view later" bookmarks. The button (all) 1206 for selecting the type of bookmark is an area operated in order to display all the normal bookmarks, and the button 1207 for selecting the type of bookmark is an area operated in order to display the bookmarks categorized into a particular folder. The bookmark display area 1204 includes a thumbnail image 1208 of the content for which the bookmark is set and content descriptions 1209 thereof.

The user can select the bookmark from the bookmark screen to display the content detail screen (not shown) and view the content for which the bookmark is set.

FIG. 13 is the explanatory diagram of the bookmark management screen displayed on the personal computer CL02.

When the user clicks on the bookmark management button 1203 on the bookmark screen illustrated in FIG. 12, the bookmark management screen is displayed. The bookmark management screen for the personal computer CL02 includes a bookmark management operation area 1301 including a folder selection area 1302, a "new folder" button 1303, and a "rename" button 1304.

The folder selection area 1302 is an area operated in order to select the already-set folder. The "new folder" button 1303 is an area operated in order to set a new folder. The "rename" button is an area operated in order to change the name of the already-set folder.

(Screen Displayed on Smartphone CL03)

FIG. 14 is the explanatory diagram of the top menu screen displayed on the smartphone CL03.

The smartphone CL03 has a small screen size, and hence it is difficult to display a large amount of information thereon. Therefore, the top menu screen for the smartphone CL03 includes a menu area 1401 including buttons for selecting the screen to be displayed next, and the other information (for example, details of content and thumbnails) is not displayed. The menu area 1401 includes a bookmark display button 1403 for transitioning to the bookmark screen illustrated in FIG. 15.

FIG. 15 is the explanatory diagram of the bookmark screen displayed on the smartphone CL03.

When the user selects the bookmark display button 1403 on the top menu screen illustrated in FIG. 14 to request the display of the bookmarks as illustrated in Step 432 of FIG. 4C, the bookmark screen is displayed. It should be noted that another screen may be used to allow the selecting of the type of bookmark (for example, all the bookmarks, "view later" bookmarks, bookmarks categorized into the particular folder) to be displayed.

The bookmark screen for the smartphone CL03 includes a thumbnail image 1501 of the content for which the bookmark is set, content descriptions 1502 thereof, and an operation area 1503 including various buttons.

FIG. 16 is the explanatory diagram of the content detail screen displayed on the smartphone CL03.

When the user selects the content on the bookmark screen illustrated in FIG. 15 to request the display of content detail information as illustrated in Step 422 of FIG. 4B, Step 436 of FIG. 4C, and Step 459 of FIG. 4D, the content detail screen is displayed.

The content detail screen for the smartphone CL03 includes, as information on the content, a thumbnail image 1605 of this content, content descriptions 1606 thereof, a "resume viewing" button 1602, a "view" button 1603, and a bookmark registration button 1604.

The "resume viewing" button 1602 is an area operated in order to view this content from the location at which the viewing was interrupted before. The "view" button 1603 is an area operated in order to view this content from the beginning. The bookmark registration button 1604 is an area operated in order to set the bookmark for this content.

Figure 17:
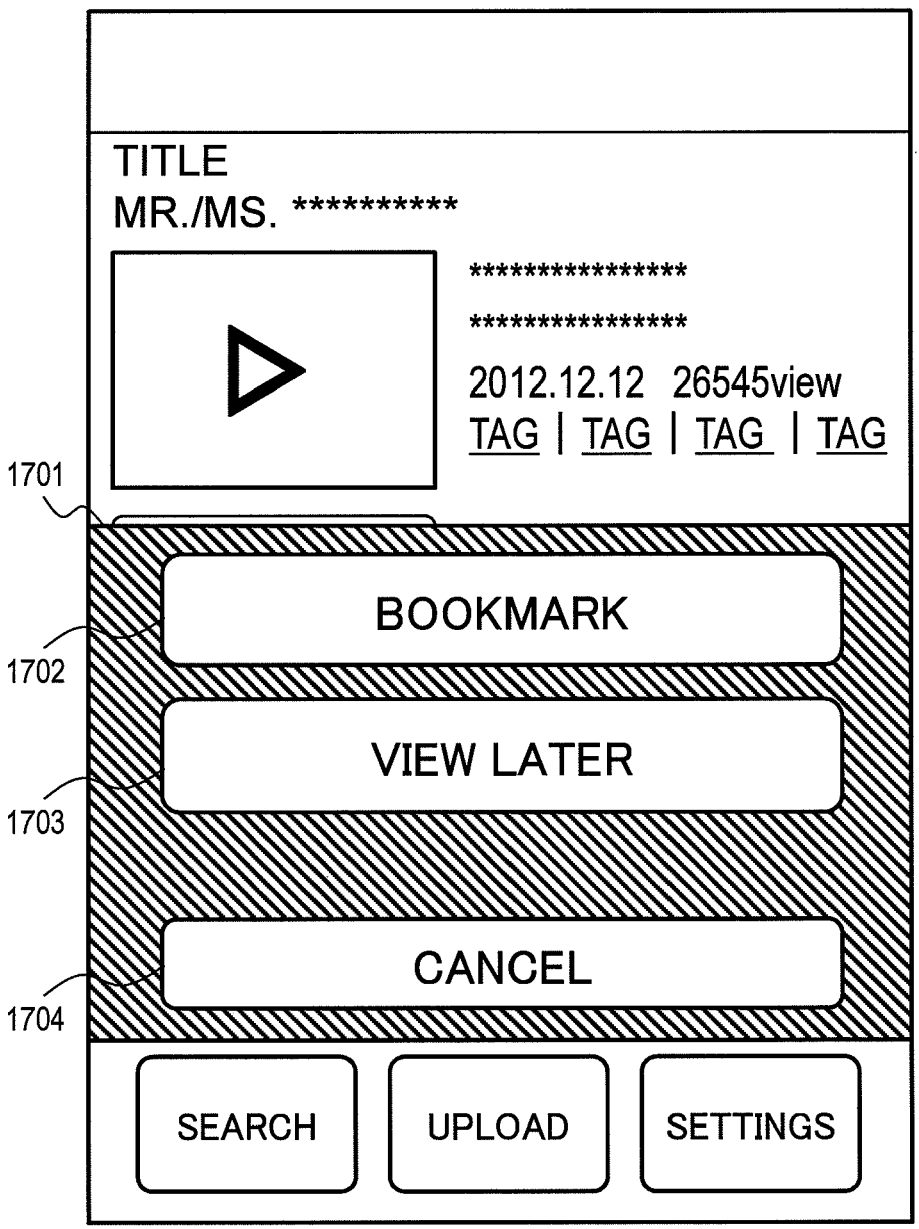
FIG. 17 is the explanatory diagram of the bookmark registration screen displayed on the smartphone.

FIG. 17 is the explanatory diagram of the bookmark registration screen displayed on the smartphone CL03. A bookmark selection menu screen 1701 illustrated in FIG. 17 is displayed on the content detail screen illustrated in FIG. 16 when the bookmark registration button 1604 is operated.

The bookmark selection menu screen 1701 includes a "bookmark" button 1702, a "view later" button 1703, and a "cancel" button 1704.

The "bookmark" button 1702 is an area operated in order to set the normal bookmark for this content. The "view later" button 1703 is an area operated in order to set the "view later" bookmark for this content. The "cancel" button 1704 is an area operated in a case of aborting the setting of the bookmark.

As described above, according to the video distribution system of the embodiment of this invention, not only the normal bookmark but also the "view later" bookmark can be set, and hence it is possible to improve convenience of the user by preferentially displaying the content for which the "view later" bookmark is set when the user uses the terminal suitable for this content.

In particular, the bookmarks are displayed so that the "view later" bookmarks come first in the case of using the terminal having a large screen size, and hence the content for which the "view later" bookmark is set can be viewed on a large screen without making a search up to the last part of the bookmarks that are displayed in order.

Further, the "view later" bookmark is deleted after the viewing of the content for which the "view later" bookmark is set is completed, and hence the "view later" bookmark that is no longer necessary can be processed with ease, which can improve the convenience of the user. In addition, before the "view later" bookmark is deleted, the user is allowed to select any one of changing of the "view later" bookmark to the normal bookmark, continuing of the "view later" bookmark, and deleting of the "view later" bookmark, and hence the "view later" bookmark that is no longer necessary can be made use of with effectiveness and smoothness.

While the present invention has been described in detail and pictorially in the accompanying drawings, the present invention is not limited to such detail but covers various obvious modifications and equivalent arrangements, which fall within the purview of the appended claims.

What is claimed is:

1. A video distribution system for distributing a video to a plurality of kinds of receiving terminals, the video distribution system comprising:
a video distribution module for distributing video data stored in a library;
a control module for generating screen data for displaying a list of the videos to be distributed to one of the receiving terminals; and
a bookmark management module for managing information set for the video, wherein:
the bookmark management module manages a first type bookmark which cannot be deleted by the bookmark management module and a second type bookmark which can be deleted by the bookmark management module; and
the control module is configured to:
generate screen data in which the information on the video for which the second type bookmark is set is positioned in a higher level than the information on the video for which the first type bookmark is set on a first terminal that satisfies a predetermined condition among the plurality of kinds of the receiving terminals;
transmit the generated screen data to the one of the receiving terminals; and
set one of the first type bookmark and the second type bookmark, which is selected by a user using the one of the receiving terminals, for the video and record the one of the first type bookmark and the second type bookmark in the bookmark management module.

2. The video distribution system according to claim 1, wherein the control module is further configured to:
generate screen data that enables selection of one of erasing of the second type bookmark set for the video and changing of the second type bookmark to the first type bookmark after the user has viewed on the first terminal the video for which the second type bookmark is set; and
erase the second type bookmark when the erasing of the second type bookmark is selected.

3. An information providing device for providing information on a video to be distributed to a plurality of kinds of receiving terminals, the information providing device comprising:
a video distribution module for distributing video data stored in a library;
a control module for generating screen data for displaying a list of the videos to be distributed to one of the receiving terminals; and
a bookmark management module for managing information set for the video, wherein:
the bookmark management module manages a first type bookmark which cannot be deleted by the bookmark management module and a second type bookmark which can be deleted by the bookmark management module; and
the control module includes:
a module for generating screen data in which the information on the video for which the second type bookmark is set is positioned in a higher level than the information on the video for which the first type bookmark is set on a first terminal that satisfies a predetermined condition among the plurality of kinds of the receiving terminals;
a module for transmitting the generated screen data to the one of the receiving terminals; and
a module for setting one of the first type bookmark and the second type bookmark, which is selected by a user using the one of the receiving terminals, for the video and recording the one of the first type bookmark and the second type bookmark in the bookmark management module.

4. The information providing device according to claim 3, wherein:
the control module further includes a module for generating screen data that enables selection of one of erasing of the second type bookmark set for the video and changing of the second type bookmark to the first type bookmark after the user has viewed on the first terminal the video for which the second type bookmark is set; and the control module erases the second type bookmark when the erasing of the second type bookmark is selected.

5. A video information providing method for use in a video distribution system for distributing a video to receiving terminals of a plurality of kinds, the video distribution system including a video distribution module for distributing video data stored in a library, a control module for generating screen data for displaying a list of the videos to be distributed to one of the receiving terminals, and a bookmark management module for retaining information set for the video, the bookmark management module managing a first type bookmark which cannot be deleted by the bookmark management module and a second type bookmark which can be deleted by the bookmark management module, the video information providing method including the steps of:

generating screen data in which the information on the video for which the second type bookmark is set is positioned in a higher level than the information on the video for which the first type bookmark is set on a first terminal that satisfies a predetermined condition among the plurality of kinds of the receiving terminals;

transmitting the generated screen data to the one of the receiving terminals; and setting one of the first type bookmark and the second type bookmark, which is selected by a user using the one of the receiving terminals, for the video and recording the one of the first type bookmark and the second type bookmark in the bookmark management module.

6. The video information providing method according to claim 5, further including the steps of:

generating screen data that enables selection of one of erasing of the second type bookmark set for the video and changing of the second type bookmark to the first type bookmark after the user has viewed on the first terminal the video for which the second type bookmark is set; and erasing the second type bookmark when the erasing of the second type bookmark is selected.

* * * * *